United States Patent
Kamiyama et al.

(10) Patent No.: US 8,359,073 B2
(45) Date of Patent: Jan. 22, 2013

(54) POWER TRANSMISSION CONTROL DEVICE, POWER TRANSMISSION DEVICE, POWER RECEIVING CONTROL DEVICE, POWER RECEIVING DEVICE, AND ELECTRONIC APPARATUS

(75) Inventors: Masayuki Kamiyama, Nagoya (JP); Kota Onishi, Nagoya (JP); Nobutaka Shiozaki, Nagoya (JP); Kentaro Yoda, Chino (JP); Takahiro Kamijo, Fujimi (JP)

(73) Assignee: Seiko Epson Corporation, Tokyo (JP)

( * ) Notice: Subject to any disclaimer, the term of this patent is extended or adjusted under 35 U.S.C. 154(b) by 762 days.

(21) Appl. No.: 12/500,075

(22) Filed: Jul. 9, 2009

(65) Prior Publication Data
US 2010/0013319 A1    Jan. 21, 2010

(30) Foreign Application Priority Data
Jul. 16, 2008    (JP) .................................. 2008-185396

(51) Int. Cl.
*H04M 1/00*    (2006.01)

(52) U.S. Cl. .......... 455/573; 455/522; 455/69; 455/574; 320/115; 323/355; 379/443; 307/104; 307/140

(58) Field of Classification Search .................. 455/573, 455/522, 69, 403, 24, 550.1, 556.1, 572, 455/574; 320/108, 109, 115; 323/355; 379/443; 370/104, 140, 150
See application file for complete search history.

(56) References Cited

U.S. PATENT DOCUMENTS

| | | | | |
|---|---|---|---|---|
| 7,109,682 | B2 * | 9/2006 | Takagi et al. .................. | 320/108 |
| 7,233,137 | B2 * | 6/2007 | Nakamura et al. ............ | 323/355 |
| 8,054,036 | B2 * | 11/2011 | Onishi et al. ................... | 320/108 |
| 2004/0145342 | A1 * | 7/2004 | Lyon .............................. | 320/108 |
| 2006/0287763 | A1 * | 12/2006 | Ochi et al. ..................... | 700/231 |
| 2009/0322280 | A1 * | 12/2009 | Kamijo et al. ................ | 320/108 |
| 2009/0322281 | A1 * | 12/2009 | Kamijo et al. ................ | 320/108 |
| 2010/0013319 | A1 * | 1/2010 | Kamiyama et al. ........... | 307/104 |
| 2010/0013322 | A1 * | 1/2010 | Sogabe et al. ................ | 307/104 |

FOREIGN PATENT DOCUMENTS

| | | |
|---|---|---|
| JP | A-2000-163524 | 6/2000 |
| JP | A-2003-255069 | 9/2003 |
| JP | A-2006-60909 | 3/2006 |

* cited by examiner

*Primary Examiner* — Shaima Q Aminzay
(74) *Attorney, Agent, or Firm* — Oliff & Berridge, PLC

(57) ABSTRACT

There is provided a power transmission control device included in a power transmission device in a contactless power transmission system that transmits power from the power transmission device to a power receiving device by electromagnetically coupling a primary coil to a secondary coil to supply the power to a load of the power receiving device. The power transmission control device includes a controller controlling the power transmission control device, a host interface communicating with a power transmission-side host, and a register section accessible from the power transmission-side host via the host interface. The controller shifts into a communication mode that executes communication between the power transmission-side host and a power receiving-side host, when the power transmission-side host writes, via the host interface, a communication request command that requests the communication between the hosts in the register section. Then, the controller transmits the communication request command to the power receiving device.

22 Claims, 17 Drawing Sheets

POWER TRANSMISSION SIDE (PRIMARY SIDE)

| REGISTER NAME | | bit7 | bit6 | bit5 | bit4 | bit3 | bit2 | bit1 | bit0 |
|---|---|---|---|---|---|---|---|---|---|
| SoftReset | | - | - | - | - | - | - | - | SoftReset |
| SWITCHING | | OUTxIN | - | - | - | - | - | - | - |
| STATUS | | PriBusy | SecReq | ChgErr | FullChg | ComSel | DrvOn | SetUp | NegoTran |
| COMMAND | | - | - | ReChgSend | ACKSend | Data1Send | Data0Send | OutSend | InSend |
| INTER-RUPTION | ENABLE | EnINTComRcv | EnDt1ComRcv | EnDt0ComRcv | EnSTALLComRcv | EnNAKComRcv | EnACKComRcv | EnErrComRcv | EnReChgOn |
| | | 1 | 1 | 1 | 1 | 1 | 1 | 0 | 1 |
| | STATUS | INTComRcv | Dt1ComRcv | Dt0ComRcv | STALLComRcv | NAKComRcv | ACKComRcv | ErrComRcv | ReChgOn |
| DATA | | (msb) | | | TranBuf_0[7:0] | | | | (lsb) |
| | | (msb) | | | TranBuf_1[7:0] | | | | (lsb) |
| | | (msb) | | | TranBuf_2[7:0] | | | | (lsb) |
| | | (msb) | | | TranBuf_3[7:0] | | | | (lsb) |
| | | (msb) | | | TranBuf_4[7:0] | | | | (lsb) |
| | | (msb) | | | TranBuf_5[7:0] | | | | (lsb) |
| | | (msb) | | | TranBuf_6[7:0] | | | | (lsb) |
| | | (msb) | | | TranBuf_7[7:0] | | | | (lsb) |
| | | (msb) | | | RcvMsg[7:0] | | | | (lsb) |
| | | (msb) | | | RcvComCode[7:0] | | | | (lsb) |

FIG. 9

POWER RECEIVING SIDE (SECONDARY SIDE)

| REGISTER NAME | | bit7 | bit6 | bit5 | bit4 | bit3 | bit2 | bit1 | bit0 |
|---|---|---|---|---|---|---|---|---|---|
| STATUS | | - | - | SecBusy | PriReq | ComSel | FullChg | - | - |
| COMMAND | | - | STALLSend | NAKSend | ACKSend | Data1Send | Data0Send | INTSend | STOPSend |
| INTER-RUPTION | ENABLE | EnReChgRcv | EnDt1ComRcv | EnDt0ComRcv | EnINComRcv | EnOUTComRcv | EnACKComRcv | EnICutXOn | EnReChgOn |
| | | 1 | 1 | 1 | 1 | 1 | 1 | 0 | 1 |
| | STATUS | ReChgRcv | Dt1ComRcv | Dt0ComRcv | INComRcv | OUTComRcv | ACKTRcv | ICutXOn | ReChgOn |
| DATA | | (msb) TranBuf_0[7:0] (Burst Mode Support) (lsb) | | | | | | | |
| | | (msb) TranBuf_1[7:0] (lsb) | | | | | | | |
| | | (msb) TranBuf_2[7:0] (lsb) | | | | | | | |
| | | (msb) TranBuf_3[7:0] (lsb) | | | | | | | |
| | | (msb) TranBuf_4[7:0] (lsb) | | | | | | | |
| | | (msb) TranBuf_5[7:0] (lsb) | | | | | | | |
| | | (msb) TranBuf_6[7:0] (lsb) | | | | | | | |
| | | (msb) TranBuf_7[7:0] (lsb) | | | | | | | |
| | | (msb) SendMsg[7:0] (lsb) | | | | | | | |

FIG.10

POWER TRANSMISSION CONTROL DEVICE, POWER TRANSMISSION DEVICE, POWER RECEIVING CONTROL DEVICE, POWER RECEIVING DEVICE, AND ELECTRONIC APPARATUS

The present application claims a priority based on Japanese Patent Application No. 2008-185396 filed on Jul. 16, 2008, the contents of which are incorporated herein by reference.

BACKGROUND

1. Technical Field

The present invention relates to a power transmission control device, a power transmission device, a power receiving control device, a power receiving device, and an electronic apparatus.

2. Related Art

Recently, contactless power transmission (non-contact power transmission) has been highlighted as a technique allowing power transmission using electromagnetic induction, without contact between metal portions. For example, there is a disclosed technique in which the contactless power transmission is applied to charging of mobile phones and household appliances, such as a cordless handset of a phone system.

JP-A-2006-60909 is an example of related art regarding the contactless power transmission. In this technique, an authentication code is transmitted and received between a power transmission side (a primary side) device and a power receiving side (a secondary side) device to achieve ID authentication so as to detect insertion of a foreign object or the like.

Thus, in the above technique, for appropriate contactless power transmission between the power transmission side device and the power receiving side device, transmission of an authentication code is executed, whereas the technique is not ready for data transmission at an application level higher than that. Accordingly, there has yet been no method for achieving data communication between a power transmission side host and a power receiving side host, for example, by effectively utilizing a charging time of an electronic apparatus.

SUMMARY

Advantages of the present invention are to provide a power transmission control device, a power transmission device, a power receiving control device, a power receiving device, and an electronic apparatus, which allow appropriate execution of data communication between a power transmission-side host and a power receiving-side host.

According to a first aspect of the invention, there is provided a power transmission control device included in a power transmission device in a contactless power transmission system that transmits power from the power transmission device to a power receiving device by electromagnetically coupling a primary coil to a secondary coil to supply the power to a load of the power receiving device. The power transmission control device includes a controller controlling the power transmission control device, a host interface communicating with a power transmission-side host, and a register section accessible from the power transmission-side host via the host interface, the controller shifting into a communication mode that executes communication between the power transmission-side host and a power receiving-side host, when the power transmission-side host writes, via the host interface, a communication request command that requests the communication between the hosts in the register section, as well as the controller transmitting the communication request command to the power receiving device.

The power transmission control device includes the host interface communicating with the power transmission-side host and the register section accessible by the power transmission-side host via the host interface. When the power transmission-side host writes a communication request command in the register section via the host interface, the controller shifts into the communication mode executing inter-host communication, and the communication request command is transmitted to the power receiving device. In this manner, contactless power transmission can be effectively utilized to execute appropriate data communication between the power transmission-side host and the power receiving-side host.

In the power transmission control device, preferably, the controller receives a communication request by the communication request command after completion of an authentication processing between the power transmission device and the power receiving device and a start of normal power transmission.

Thereby, the communication request can be received after completing the authentication processing and thereby confirming appropriateness of the power receiving side and compatibility between the power transmission side and the power receiving side. Consequently, appropriate data communication can be achieved.

In the power transmission control device, preferably, the register section includes a command register in which a command issued by the power transmission-side host is written and a data register that buffers data, and the controller transmits, to the power receiving device, an OUT transmission command that requests data transmission from the power transmission-side host to the power receiving-side host when the OUT transmission command is written in the command register, and then, the controller transmits a data transmission command that directs the data transmission and data to the power receiving device when the data transmission command is written in the command register and the data is written in the data register.

In this manner, the power transmission-side host writes the OUT transmission command in the register section, whereby the controller shifts into the communication mode for OUT transmission that allows data transmission from the power transmission-side host to the power receiving-side host.

In the power transmission control device, preferably, the register section includes a command register in which a command issued by the power transmission-side host is written and a data register that buffers data, and the controller transmits, to the power receiving device, an IN transmission command that requests data transmission from the power receiving-side host to the power transmission-side host when the IN transmission command is written in the command register, and then, the controller writes data received from the power receiving device in the data register when receiving a data transmission command that directs the data transmission and the data from the power receiving device.

In this manner, the power transmission-side host writes the IN transmission command in the register section, whereby the controller shifts into a communication mode executing IN transmission that allows data transmission from the power receiving-side host to the power transmission-side host.

In the power transmission control device, preferably, the controller sets at least one of a transmission condition for contactless power transmission and a communication condition between the power transmission device and the power receiving device to a condition for the communication mode that is different from a condition for normal power transmission, when the controller shifts into the communication mode.

In this manner, the transmission condition and the communication condition for the communication mode can be set separately from the transmission condition and the communication condition for normal power transmission. Thus, communication reliability and the like can be improved.

According to a second aspect of the invention, there is provided a power transmission control device included in a power transmission device in a contactless power transmission system that transmits power from the power transmission device to a power receiving device by electromagnetically coupling a primary coil to a secondary coil to supply the power to a load of the power receiving device. The power transmission control device includes a controller controlling the power transmission control device, a host interface communicating with a power transmission-side host, and a register section accessible from the power transmission-side host via the host interface, the controller setting at least one of a transmission condition for contactless power transmission and a communication condition between the power transmission device and the power receiving device to a condition for a communication mode that is different from a condition for normal power transmission, when shifting into the communication mode that executes communication between the power transmission-side host and the power receiving-side host.

The power transmission control device includes the host interface communicating with the power transmission-side host and the register section accessible by the power transmission-side host via the host interface. In the communication mode, the transmission condition and the communication condition for the contactless power transmission are set to the transmission condition and the communication condition for the communication mode. Thereby, the transmission condition and the communication condition for the communication mode can be set separately from the transmission condition and the communication condition for normal power transmission. Thus, communication reliability and the like can be improved.

In the power transmission control device, preferably, when shifting into the communication mode, the controller switches a driving frequency or a driving voltage of the primary coil to a driving frequency or a driving voltage of the coil for the communication mode.

Thereby, in the communication mode, the driving frequency or the driving voltage of the primary coil can be set to a frequency or a voltage most suitable for communication.

Preferably, the register section includes a status register having a bit that allows the power transmission-side host to confirm a power transmission state of contactless power transmission.

In this manner, the power transmission-side host can confirm the power transmission state in the contactless power transmission by effectively utilizing the register section provided for inter-host communication.

Preferably, the load includes a battery, and the status register has a bit that allows the power transmission-side host to confirm a charge state of the battery.

In this manner, the power transmission-side host can confirm the charge state of the battery by effectively utilizing the register section provided for inter-host communication.

Preferably, the register section includes an interruption register having a bit that notifies reception of a command issued by the power receiving-side host to the power transmission-side host upon reception of the command.

In this manner, until the command reception is notified, the power transmission-side host can execute other processing. This can reduce a processing load of the power transmission-side host, for example.

Preferably, the load includes a battery, and the interruption register has a bit that notifies a start of charging of the battery to the power transmission-side host.

In this manner, the power transmission-side host can obtain a timing for the start of charging, thereby enabling more intelligent processing to be executed.

Preferably, the controller shifts into the communication mode upon reception of an interruption command for a communication request issued by the power receiving-side host.

In this manner, by the communication request from the power receiving-side host, similarly, the controller can shift into the communication mode.

According to a third aspect of the invention, there is provided a power transmission device including the power transmission control device of the first aspect and a power transmission section that generates an AC voltage to supply to the primary coil.

According to a fourth aspect of the invention, there is provided an electronic apparatus including the power transmission device of the third aspect.

According to a fifth aspect of the invention, there is provided a power receiving control device included in a power receiving device of a contactless power transmission system that transmits power from a power transmission device to the power receiving device by electromagnetically coupling a primary coil to a secondary coil to supply the power to a load of the power receiving device. The power receiving control device includes a controller controlling the power receiving control device, a host interface communicating with a power receiving-side host, and a register section accessible from the power receiving-side host via the host interface, the controller shifting into a communication mode that executes communication between a power transmission-side host and the power receiving-side host, when receiving a communication request command that requests the communication between the hosts from the power transmission device.

The power receiving control device includes the host interface communicating with the power receiving-side host and the register section accessible by the power receiving-side host via the host interface. Then, upon reception of the communication request command from the power transmission device, the controller shifts into the communication mode allowing inter-host communication. In this manner, by effectively utilizing contactless power transmission, data communication can be approximately executed between the power transmission-side host and the power receiving-side host.

In the power receiving control device, preferably, the controller receives a communication request by the communication request command after completion of an authentication processing between the power transmission device and the power receiving device and a start of normal power transmission.

In this manner, the communication request can be received after confirming appropriateness of the power transmission side and compatibility between the power transmission side and the power receiving side by completing the authentication processing. Thus, data communication can be appropriately executed.

Preferably, the register section includes a command register in which a command issued by the power receiving-side host is written, and the controller shifts into the communication mode when the power receiving-side host writes an interruption command for a communication request to the power transmission-side host in the command register.

In this manner, the controller can shift into the communication mode also by the communication request from the power receiving-side host.

Preferably, the load includes a battery, and the register section includes a status register having a bit that allows the power receiving-side host to confirm a charge state of the battery.

In this manner, the power receiving-side host can confirm the state of charging of the battery by effectively utilizing the register section provided for the inter-host communication.

Preferably, the register section includes an interruption register having a bit that notifies reception of a command issued by the power transmission-side host to the power receiving-side host upon reception of the command.

In this manner, until the command reception is notified, the power receiving-side host can execute other processing, thereby enabling a processing load of the power receiving-side host to be reduced, for example.

According to a sixth aspect of the invention, there is provided a power receiving device including the power receiving control device of the first aspect and a power receiving section that converts an induced voltage of the secondary coil to a DC voltage.

According to a seventh aspect of the invention, there is provided an electronic apparatus including the power receiving device of the sixth aspect and a load that receives power from the power receiving device.

BRIEF DESCRIPTION OF THE DRAWINGS

The invention will be described with reference to the accompanying drawings, wherein like numbers reference like elements.

FIG. 9 is a diagram of a register map of a power transmission side.

FIG. 10 is a diagram of a register map of a power receiving side.

DESCRIPTION OF EXEMPLARY EMBODIMENTS

Embodiments of the invention will be described in detail. The embodiments below do not unduly restrict the scope of the invention claimed, and all of structures included in description of the embodiments are not necessarily essential to the invention.

1. Electronic Apparatus

Figure 1A:
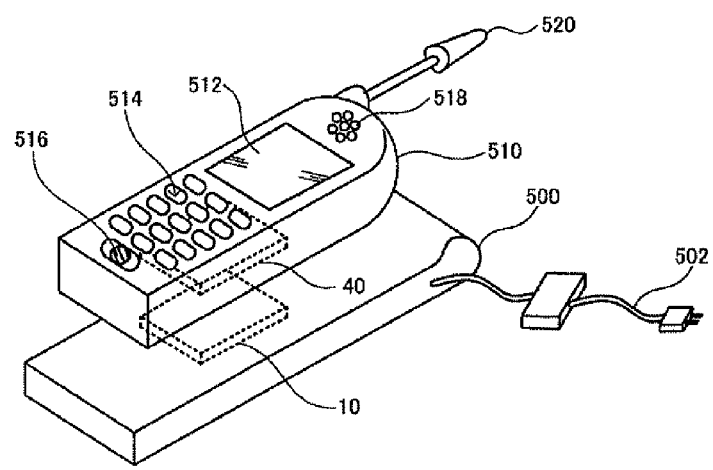
FIGS. 1A, 1B, and 1C are illustrations of contactless power transmission.

FIG. 1A shows examples of an electronic apparatus applying a contactless power transmission system according to an embodiment of the invention. A charger 500 (a cradle) as an example of the electronic apparatus includes a power transmission device 10. A mobile phone 510 as another example of the electronic apparatus includes a power receiving device 40. The mobile phone 510 further includes a display section 512 such as a liquid crystal display (LCD), a operating section 514 with buttons or the like, a microphone 516 (a speech sound inputting section), a speaker 518 (a speech sound outputting section), and an antenna 520.

The charger 500 receives power via an AC adapter 502. The power supplied to the charger 500 is transmitted from the power transmission device 10 to the power receiving device 40 by the contactless power transmission. This allows charging of a battery of the mobile phone 510 and operation of a device in the mobile phone 510.

The electronic apparatus applying the embodiment is not restricted to the mobile phone 510 and may be applied to various electronic apparatuses such as a watch, a cordless phone, a shaver, an electric toothbrush, a wrist computer, a handy terminal, a mobile information terminal, an electric bicycle, and an IC card.

Figure 1B:
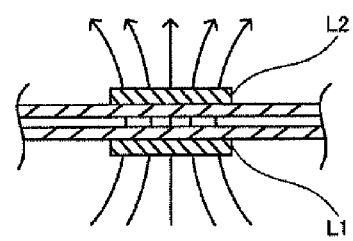

As schematically shown in FIG. 1B, power transmission from the power transmission device 10 to the power receiving device 40 is executed using a power transmission transformer formed by electromagnetically coupling a primary coil L1 (a power transmitting coil) included in the power transmission device 10 to a secondary coil L2 (a power receiving coil) included in the power receiving device 40. This allows non-contact power transmission.

In FIG. 1B, the primary coil L1 and the secondary coil L2 are each, for example, a planar coil with an air core formed by spirally winding a coil wire around a planar surface. However, the coils included in the embodiment are not restricted to that and can be selected from coils having various shapes and structures as long as the coils can transmit power by being electromagnetically coupled to each other as the primary and the secondary coils L1 and L2.

Figure 1C:
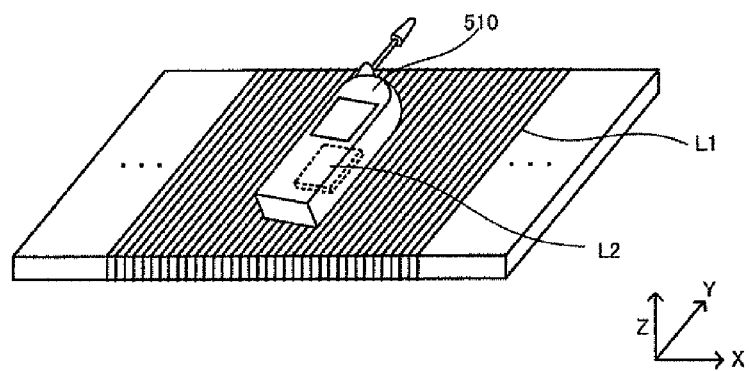

For example, in FIG. 1C, the primary coil L1 is formed by spirally winding a coil wire around a magnetic core in an X-axis direction. The secondary coil L2 in the mobile phone 510 is formed in a same manner as in the primary coil L1. The embodiment can be applied to the coils shown in FIG. 1C. In this case, as each of the primary and the secondary coils L1 and L2, a coil formed by winding a coil wire in the X-axis direction may be combined with a coil formed by winding a coil wire in a Y-axis direction.

2. Structure

Figure 2:
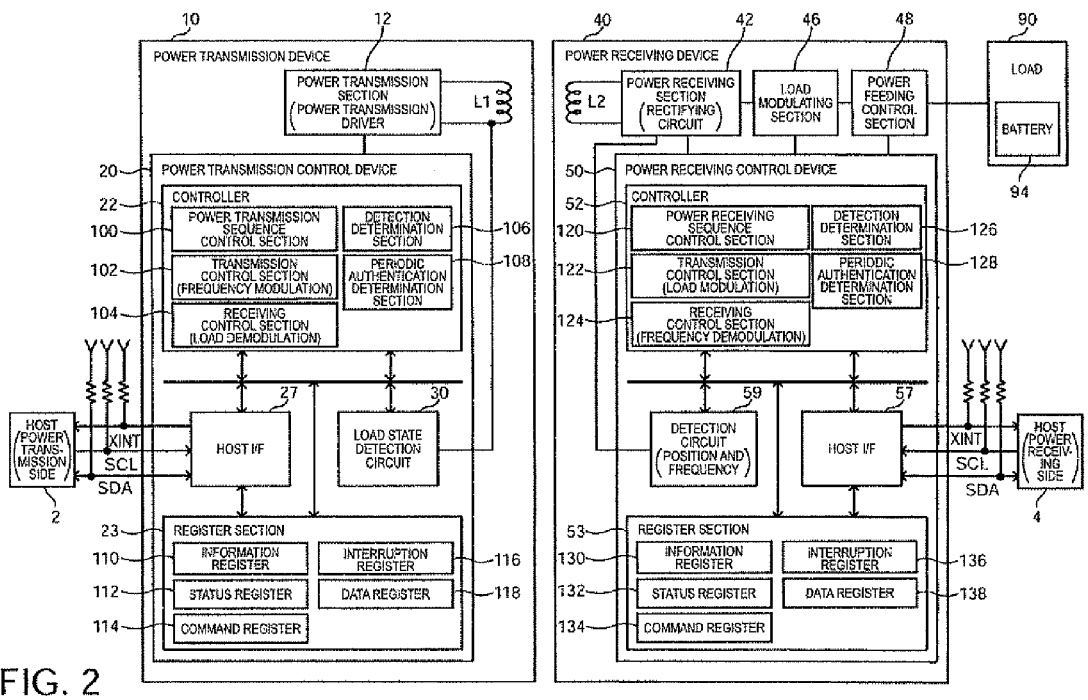
FIG. 2 is a diagram showing a structural example of a contactless power transmission system including a power transmission device, a power transmission control device, a power receiving device, and a power receiving control device according to an embodiment of the invention.

FIG. 2 shows a structural example including the power transmission device 10, a power transmission control device 20, the power receiving device 40, and a power receiving control device 50. As in FIG. 1A, the electronic apparatus of a power transmission-side, such as the charger 500, may include the power transmission device 10 and a power transmission-side host 2, and the electronic apparatus of a power receiving side, such as the mobile phone 510, may include the power receiving device 40, a load 90 (a real load) and a power receiving-side host 4. The hosts (host processors) 2 and 4 may be, for example, a CPU, an application processor, or an application specific integrated circuit (ASIC), and may execute processing, such as general control of the electronic apparatuses of the power transmission side and the power receiving side. With the structure shown in FIG. 2, for example, by electromagnetically coupling the primary coil L1 to the secondary coil L2, power is transmitted from the power transmission device 10 to the power receiving device 40 to establish a contactless power transmission (non-contact power transmission) system so as to supply the power to the load 90.

The power transmission device 10 (a power transmission module, primary module) may include the primary coil L1, a power transmission section 12, and the power transmission control device 20. Structures of the power transmission device 10 and the power transmission control device 20 are not restricted to those shown in FIG. 2 and can be modified in various manners, such as omitting a part of constituent elements in the devices, adding any other constituent element (e.g. a waveform monitor circuit), or changing a connection relation between the elements. For example, the power transmission control device 20 may include the power transmission section 12.

The primary coil L1 (the power transmission-side coil) is electromagnetically coupled to the secondary coil L2 (the power receiving-side coil) to form the power transmission transformer. For example, when power transmission is needed, as shown in FIGS. 1A and 1B, the mobile phone 510 is placed on the charger 500 so that magnetic flux of the primary coil L1 passes through the secondary coil L2. Conversely, when no power transmission is needed, the charger 500 and the mobile phone 510 are physically separated from each other so that the magnetic flux of the primary coil L1 does not pass through the secondary coil L2.

The power transmission section 12 generates an AC voltage having a predetermined frequency upon power transmission and generates an AC voltage having a different frequency depending on data upon data transmission to supply the respective voltages to the primary coil L1. The power transmission section 12 may include a first power transmitting driver driving an end of the primary coil L1, a second power transmitting driver driving an other end of the primary coil L1, and at least one capacitor included, along with the primary coil L1, in a resonance circuit. Each of the first and the second power transmitting drivers of the power transmission section 12 may be an inverter circuit (a buffer circuit) constructed by a power metal-oxide-silicon (MOS) transistor or the like. Each of the drivers is controlled by the power transmission control device 20.

In FIG. 2, data communication from the power transmission side to the power receiving side is executed by using frequency modulation, and data communication from the power receiving side to the power transmitting side is executed by using load modulation.

Figure 3A:
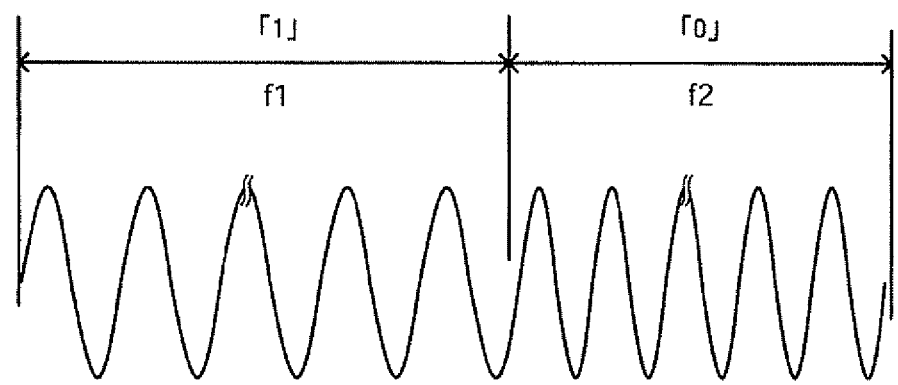
FIGS. 3A and 3B are illustrations showing data transmissions by frequency modulation and load modulation.

Specifically, as shown in FIG. 3A, the power transmission section 12 generates an AC voltage having a frequency f1 when data "1" is transmitted to the power receiving side, and generates an AC voltage having a frequency f1 when data "0" is transmitted to the power receiving side. Then, a detection circuit 59 of the power receiving side detects the frequency change to distinguish the data "1" from the data "0". Consequently, data communication from the power transmission side to the power receiving side can be achieved by frequency modulation.

Figure 3B:
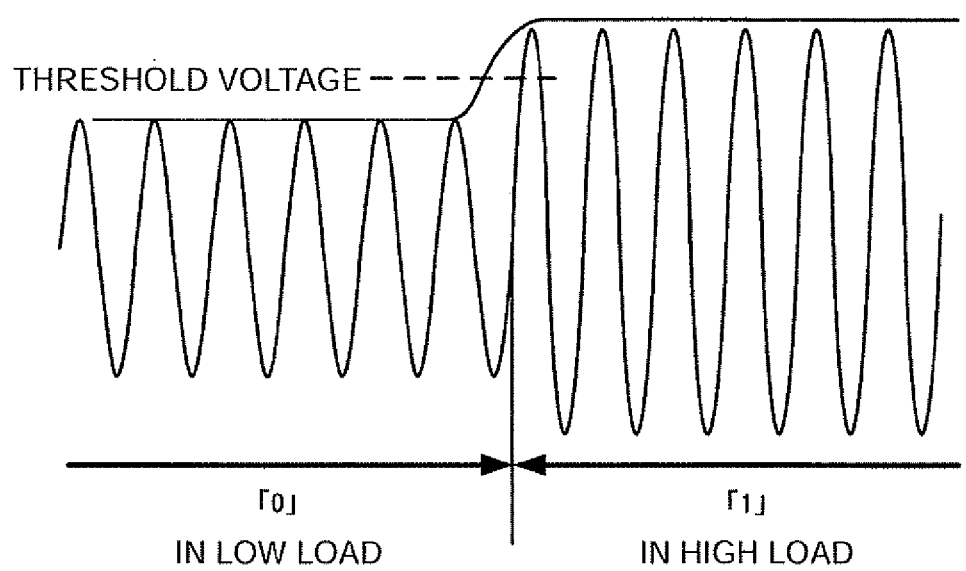

Meanwhile, a load modulation section 46 of the power receiving side variably changes a load of the power receiving side in accordance with transmitted data to change a signal waveform of an induced voltage in the primary coil L1, as shown in FIG. 3B. For example, when the data "1" is transmitted to the power transmitting side, the load modulation section 46 allows the power receiving side to be in a high load state. In contrast, when the data "0" is transmitted, the power receiving side is set in a low load state. Then, a load state detection circuit 30 of the power transmission side detects the change in the load state of the power receiving side to distinguish the data "1" from the data "0". This allows data communication from the power receiving side to the power transmission side by using load modulation.

In FIGS. 3A and 3B, the data communication from the power transmission side to the power receiving side is executed by frequency modulation, whereas the data communication from the power receiving side to the power transmission side is executed by load modulation. However, other modulation methods or other methods may be alternatively used.

The power transmission control device 20 executes various control processing for the power transmission device 10 and may be an integrated circuit device (an IC device), a micro computer and its program, or the like. The power transmission control device 20 may include a controller 22, a register section 23, a host I/F (interface) 27, and the load state detection circuit 30. A part of the constituent components (such as the load state detection circuit) may be omitted, any other constituent component may be added, or other modifications may be made.

The controller 22 (the power transmission side) controls the power transmission control device 20 and the power transmission device 10. The controller 22 may be, for example, an ASIC such as a gate array, a micro computer and a program executed by the micro computer, or the like. The controller 22 controls power transmission using the power transmission section 12, as well as controls the register section 23 and the load state detection circuit 30. Specifically, the controller 22 executes various kinds of sequence control and determination processing, which are necessary for power transmission, load state detection (e.g. data detection, foreign object detection, and removal detection), frequency modulation, and the like.

The controller 22 includes a power transmission sequence control section 100, a transmission control section 102, a receiving control section 104, a detection determination section 106, and a periodic authentication determination section 108. The power transmission sequence control section 100 performs sequence control of power transmission (normal power transmission and temporary power transmission) in contactless power transmission. For example, the transmission control section 102 controls a processing for transmitting data to the power receiving side by frequency modulation. The receiving control section 104 may control a processing for receiving data from the power receiving side by load modulation. The detection determination section 106 determines detection such as data detection, detection of a foreign object, or removal detection, based on detection information obtained when the load state detection circuit 30 detects the load state of the power receiving side. The periodic authentication determination section 108 determines whether appropriate periodic authentication was done or not, for example, in a case of periodic authentication by the power receiving side after starting of normal power transmission.

The register section 23 (a memory section) is accessible (writable and readable) by the power transmission-side host 2 via the host I/F 27 and may be formed by a RAM, a D flip-flop, or the like. The register section 23 includes an information register 110, a status register 112, a command register 114, an interruption register 116, and a data register 118. In addition, information to be stored in the register section 23 (e.g. information to be stored in the information register 110) may be stored in a nonvolatile memory such as a flash memory or a mask ROM.

The information register 110 stores information such as conditions for transmission and communication in contactless power transmission. For example, the information register 110 stores parameters of a driving frequency and a driving voltage, a parameter (a threshold) for detecting a load state of the power receiving side, and the like. The status register 112 is a register to be used when the host 2 confirms various states such as a power transmission state and a communication state. The command register 114 is a register where the host 2 writes various commands. The interruption register 116, which is used for various interruptions, includes a register setting enable or disable of the interruptions and a register notifying an interruption factor to the host 2. The data register 118 is used for buffering of transmitted data and received data.

The host I/F 27 is an interface communicating with the power transmission-side host 2. In FIG. 2, the communication between the host I/F 27 and the host 2 is executed by I2C (an inter-integrated circuit). In this case, the host 2 may be a CPU or the like incorporated in the electronic apparatus of the power transmission side (the charger).

The I2C is a communication method for transmitting data between a plurality of devices located close to each other on a same substrate, where data are transmitted between the devices connected to a bus including two signal lines for transmitting serial data (SDA) and a serial clock (SCL) signal. Specifically, a master device (a host) is connected to a plurality of devices as slaves by the bus to execute communications between the devices. The slave devices may send an interruption request signal to the master device via an external interruption (XINT) port or the I2C-bus. In the embodiment, the communication method between the host and the host I/F is not restricted to the I2C-bus method. There may be used any other method based on a same concept as the I2C, such as a normal serial interface method or a normal parallel interface method.

The load state detection circuit 30 (a waveform detection circuit) detects a load state of the power receiving side (the power receiving device or a foreign object). The load state can be detected by detecting a change in a waveform of an induced voltage signal (a coil-end signal) of the primary coil L1. For example, the waveform of the induced voltage signal changes when a load state (a load current) of the power receiving side (the secondary side) changes. The load state detection circuit 30 detects the waveform change to output a detection result (detection result information) to the controller 22. The controller 22 determines the load state (a load fluctuation and a load level) of the power receiving side (the secondary side) based on the detection result information of the load state from the load state detection circuit 30.

The power receiving device 40 (a power receiving module as a secondary module) may include the secondary coil L2, a power receiving section 42, a load modulation section 46, a power feeding control section 48, and a power receiving control device 50. Structures of the power receiving device 40 and the power receiving control device 50 are not restricted to those shown in FIG. 2 and can be modified in various manners, such as such as omitting a part of constituent elements included in the devices, adding any other constituent element (e.g. a waveform monitor circuit), or changing a connection relation between the elements. For example, the power receiving control device 50 may include any of the power receiving section 42, the load modulation section 46, and the power feeding control section 48.

The power receiving section 42 converts an induced AC voltage of the secondary coil L2 to a DC voltage. The voltage conversion can be executed, for example, by a rectifying circuit included in the power receiving section 42.

The load modulation section 46 executes load modulation. Specifically, when data is transmitted from the power receiving side to the power transmission side, a load of the load modulation section 46 (the secondary side) is variably changed in accordance with data to be transmitted, thereby changing the waveform of the induced voltage signal of the primary coil L1, as shown in FIG. 3B.

The power feeding control section 48 controls power feeding to the load 90, by switching on and off the feeding of power to the load 90. Specifically, the power feeding control section 48 adjusts a level of the DC voltage from the power receiving section 42 (the rectifying circuit) to generate a power supply voltage, which is supplied to the load 90 to charge a battery 94 of the load 90. The load 90 may be a load that does not include the battery 94.

The power receiving control device 50 executes various controls of the power receiving device 40 and may be formed by an integrated circuit device (an IC) or a micro computer and its program, for example. The power receiving control device 50 can be operated by a power supply voltage generated from the induced voltage of the secondary coil L2. The power receiving control device 50 may include a controller 52, a register section 53, a host I/F 57, and a detection circuit 59, and may be modified by omitting at least one (e.g. the detection circuit) among the constituent elements or by adding any other element, for example.

The controller 52 controls the power receiving control device 50 and the power receiving device 40 and may be formed by an ASIC circuit such as a gate array, a micro computer and a computer operating program, or the like. The controller 52 controls the load modulation section 46, the power feeding control section 48, and the register section 53. Specifically, the controller 52 executes various sequence controls and determination processings necessary for position detection, frequency detection, load modulation, full charge detection, and the like.

The controller 52 includes a power receiving sequence control section 120, a power transmission control section 122, a power receiving control section 124, a detection determination section 126, and a periodic authentication control section 128. The power receiving sequence control section 120 executes sequence control of power receiving in the contactless power transmission. The power transmission control section 122 controls the processing for receiving data from the power transmission side by frequency modulation, for example. The detection determination section 126 executes a detection determination based on detection information obtained when the detection circuit 59 executes position detection and frequency detection. The periodic authentication control section 128 controls periodic authentication executed after starting of normal power transmission. For example, to detect a so-called takeover state by a foreign object, the periodic authentication control section 128 periodically (intermittently) changes the load state of the power receiving side after normal power transmission is started.

The register section 53 (a memory section) is accessible by the power receiving-side host 4 via the host I/F 57 and may be formed by a RAM a D Rip-flop, or the like. The register section 53 includes an information register 130, a status register 132, a command register 134, an interruption register 136, and a data register 138. Information to be stored in the register section 53 (e.g. information to be stored in the information register 130) may be stored in a nonvolatile memory such as a flash memory or a mask ROM. Functions of the registers are almost the same as those of the registers of the power transmission side and thus will not be described below.

The host I/F 57 is an interface used to communicate with the power receiving-side host 4, for example, by using the I2C or the like. The host 4 may be a CPU, an application processor, or the like incorporated in the electronic apparatus of the power receiving side. The detection circuit 59 detects, for example, a positional relation between the primary and the secondary coils L1 and L2 and a coil driving frequency obtained when data is transmitted from the power transmission side to the power receiving side.

As shown in FIG. 2, in the embodiment, providing the host I/F 27 in the power transmission side and providing the host I/F 57 in the power receiving side allows communications between the power transmission-side host 2 and the power receiving-side host 4. In other words, while the conventional contactless power transmission system can transmit only ID authentication information, the structure of the embodiment shown in FIG. 2 can transmit application data or the like between a power transmission-side apparatus such as the charger and a power receiving-side apparatus such as the mobile phone by utilizing the contactless power transmission. This enables data communication to be executed between the apparatuses by effectively utilizing a charging time or the like, thereby significantly improving user convenience.

Specifically, in FIG. 2, to request communication between the power transmission-side host 2 and the power receiving-side host 4, it is assumed that a communication request command is written in the register section 23 by the host 2 via the host I/F 27. In this case, the power transmission-side controller 22 is switched to a communication mode for executing communication between the hosts 2 and 4 to transmit the communication request command to the power receiving device 40. For example, an operation mode (a sequence) of the power transmission side is switched to a communication mode for executing a communication sequence processing, as well as the communication request command is transmitted to the power receiving side by the contactless power transmission (communication between the coils).

Meanwhile, after receiving the communication request command for requesting communication between the hosts 2 and 4 from the power transmission device 10, the controller 52 of the power receiving side is switched to the communication mode. For example, when the communication request command is transmitted from the power transmission side, reception of the command is notified to the host 4, as well as an operation mode of the power receiving side is also switched to the communication mode. This allows communication between the hosts 2 and 4.

In that case, the controller 22 of the power transmission side receives the communication request of the communication request command after authentication processings (negotiation and the like) between the power transmission side and the power receiving side is completed and normal power transmission is started. For example, after temporary power transmission is completed, and then, normal power transmission is started, the controller 22 receives the communication request issued by the host 2 to shift into a communication mode.

In addition, the controller 52 of the power receiving side also receives the communication request of the communication request command after completion of the authentication and then start of the normal power transmission. In other words, the controller 52 receives the communication request command issued by the host 2 after the start of normal power transmission to shift into the communication mode.

In this manner, the communication request can be received after the completion of authentication to confirm appropriateness of the power transmission side and the power receiving side and compatibility between the sides, thereby enabling data communication to be appropriately executed. Additionally, data communication can be accomplished by effectively utilizing a normal power transmission time (a charging time), thereby improving user convenience.

The communication request command may be an OUT transmission command or an IN transmission command, for example. The OUT transmission command is a command for requesting data transmission from the power transmission-side host 2 to the power receiving-side host 4. When an OUT transmission command is written in the command register 114 of the register section 23, the controller 22 transmits the OUT transmission command to the power receiving device 40. In other words, the controller 22 transmits the OUT transmission command issued by the host 2. Next, after confirming returning of an ACK command from the power receiving side, when a data transmission command (DATA0 or DATA1) for instructing to transmit data is written in the command register 114 and corresponding data is written in the data register 118, the controller 22 transmits the data transmission command and the data to the power receiving device 40. In other words, the controller 22 transmits the data transmission command issued by the host 2 and the data from the host 2 to the power receiving device 40.

Meanwhile, the IN transmission command is a command for requesting data transmission from the power receiving-side host 4 to the power transmission-side host 2. When an IN transmission command is written in the command register 114, the controller 22 transmits the IN transmission command to the power receiving device 40. Next, after receiving a data transmission command and data from the power receiving device 40, the controller 22 writes the received data into the data register 118 and notifies the reception of the data transmission command to the host 2 by using the interruption register 116.

The controller 22, which shifts into the communication mode, switches at least one of a transmission condition for the contactless power transmission and a communication condition between the power transmission side and the power receiving side to a condition for the communication mode that is different from a condition for the normal power transmission. For example, when the normal power transmission starts, the contactless power transmission is executed under the transmission condition for the normal power transmission. After the start of the normal power transmission, if the normal power transmission mode (a charge mode) is switched to the communication mode, the transmission condition and the communication condition for the normal power transmission are switched to those for the communication mode. The communication condition may include, for example, a communication method (such as a pulse width detection method, a current detection method, or an amplitude detection method) and communication parameters (such as a frequency of frequency modulation and a threshold of load modulation).

Specifically, when the controller 22 shifts into the communication mode, driving frequencies f1 and f2 of the primary coil L1 are switched to those for the communication mode. Alternatively, a driving voltage VF of the primary coil L1 may be switched to a driving voltage for the communication mode, and load state detecting parameters (thresholds) for data detection and foreign-object detection may be switched to parameters used for the communication mode.

In the normal power transmission mode (the charge mode), for example, the transmission condition and the communication condition are set so as to achieve power transmission at a highest transmission efficiency. The communication mode does not require execution of power transmission at a high transmission efficiency, so that conditions for transmission and communication are desirably set so as to inhibit data transfer errors or the like.

Accordingly, in the present embodiment, for the communication mode, the conditions for transmission and communication are switched to conditions that give a higher priority on communication reliability than on power transmission efficiency. For example, the driving frequencies or the driving voltage may be reduced. In addition, the threshold as a communication parameter may be changed or the communication method may be changed to another method. This can lead to reduction in data transfer errors, thereby improving communication reliability.

For example, the communication condition and the transmission condition for the communication mode may be set as conditions for communication and transmission in a temporary power transmission time before the start of normal power transmission. In other words, commands (e.g. commands for a communication interruption request, full charge detection, and recharge confirmation) are transmitted during a normal power transmission time. Thus, the commands are transmitted using communication condition and transmission conditions information received from the power receiving side. On the other hand, in the communication mode that allows transmission of application data, power supply to the load 90 can be stopped. Accordingly, it is unnecessary to use the communication condition and transmission condition information from the power receiving side, so that the communication mode uses initial communication condition and transmission communication condition set to default to achieve safer and more reliable communication. In short, the communication mode uses the communication condition and the transmission condition used in the temporary power transmission time, which are set so as to prioritize communication reliability rather than power transmission efficiency.

Furthermore, as shown in FIG. 2, the register section 23 includes the status register 112 that has a bit (a register) for allowing the host 2 to confirm a power transmission state in the contactless power transmission. For example, as will be described below, the status register 112 may include a bit that confirms (notifies) a power transmission state brought by driving of the primary coil L1 and a bit that checks power transmission errors. Specifically, the status register 112 may include a bit that allows the host 2 to confirm a full-charge state of the battery 94 of the power receiving side, such as a bit confirming a full-charge state of the power receiving-side battery 94 and switching to a full-charge mode and a bit confirming that a state of the power transmission-side sequence is in a charge phase. By using the bits, the host 2 can effectively utilize the register section 23 provided for inter-host communication to confirm the state of the contactless power transmission, the charge state of the battery 94, and the like, thus achieving more intelligent control.

The register section 23 includes the interruption register 116. The interruption register 116 has a bit that notifies reception of a command issued by the power receiving-side host 4 to the power transmission-side host 2 when receiving the command, such as the data transmission command (DATA0 or DATA1), a communication interruption command (INT), or a handshake command (ACK or NAK). In this manner, the host 2 can execute other processings until such an interruption is notified, thereby enabling a processing load of the host 2 to be reduced.

Additionally, the interruption register 116 has a bit that notifies start of charging of the battery 94 to the host 2. Having the bit allows the host 2 to know a charge start timing, so as to accomplish various controls at an application level based on the notified timing.

The controller 22 shifts into the communication mode, also when receiving an interruption command for a communication request issued by the power receiving-side host 4. Specifically, when the host 4 issues the interruption command for the communication request, the interruption register 116 notifies reception of the interruption command to the host 2, whereby the controller 22 shifts into the communication mode. This allows a shift into the communication mode not only by a communication request from the power transmission-side host 2, but also by a communication request from the power receiving-side host 4. Thus, a communication request from the power receiving side can be sent to the power transmission side at a desired timing to enable desired data to be transmitted and received between the hosts 2 and 4.

Similarly, the register section 53 of the power receiving side has the command register 134 in which a command issued by the power receiving-side host 4 is written. The controller 52 of the power receiving side shifts into a communication mode when the interruption command (INT) for a communication request to the power transmission-side host 2 is written in the command register 134 by the power receiving-side host 4.

The power receiving-side register section 53 also has the status register 132. The status register 132 has a bit that allows the power receiving-side host 4 to confirm a charge state of the battery 94. For example, the bit includes a bit confirming a full charge state of the battery 94 and shifting into a full charge mode and a bit confirming that a state of the power receiving-side sequence is in a full charge phase. Having those bits enables the host 4 to effectively utilize the register section 53 provided for inter-host communication to confirm the charge state of the battery 94 and the like. As a result, more intelligent charge control and the like can be achieved.

3. Operation

Next, operation of the embodiment will be described by referring to FIG. 2 and FIGS. 4A to 6C.

Figure 4A:
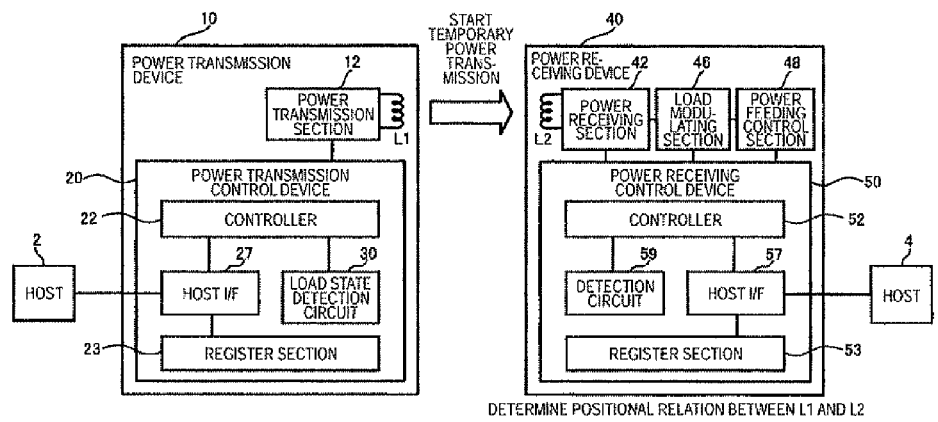
FIGS. 4A to 4C are illustrations showing operation of the devices according to the embodiment.

First, as shown in FIG. 4A, the power transmission device 10 starts temporary power transmission (power transmission for position detection) before starting normal power transmission. With the temporary power transmission, a power supply voltage is supplied to the power receiving device 40 to power on the device 40. Then, for example, the power receiving device 40 determines whether a positional relation between the primary coil L1 and the secondary coil L2 is appropriate or not, and more specifically, whether the positional relation between the coils L1 and L2 is equivalent to a positional relation as shown in FIG. 1B.

Figure 4B:
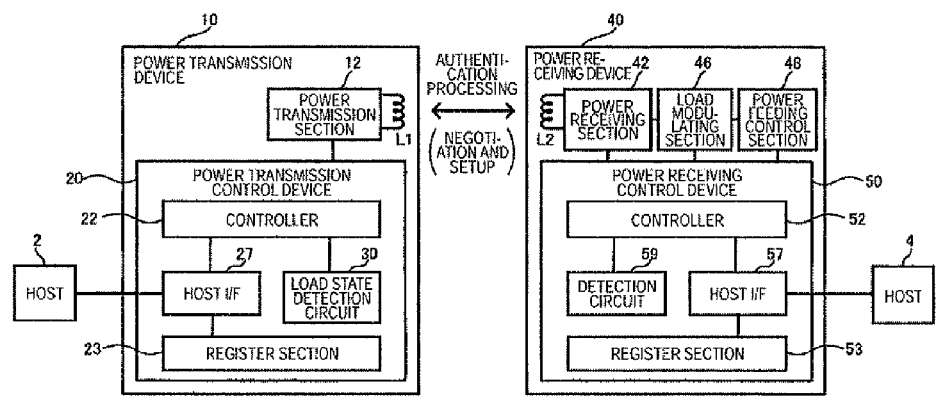

As shown in FIG. 4B, when the positional relation between the coils L1 and L2 is determined to be appropriate, authentication processing is executed while maintaining a temporary transmission condition between the power transmission side and the power receiving side. Specifically, for example, negotiation processing and setup processing may be executed, as will be described below. With those processings, various pieces of information such as a transmission condition and a communication condition are set to the information registers 110 and 130.

Figure 4C:
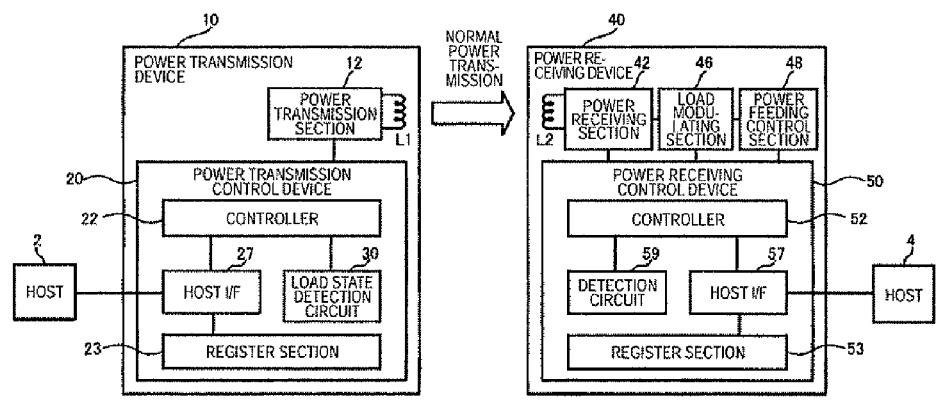

After appropriate completion of the authentication processing between the power transmission side and the power receiving side, a start frame is transmitted from the power receiving side to the power transmission side, for example. Thereby, as shown in FIG. 4C, the power transmission side starts normal power transmission to the power receiving side, whereby charging of the battery 94 of the load 90 or the like, is started.

The start of normal power transmission as above allows reception of a communication request from the power transmission-side host 2. For example, in FIG. 5A, the power transmission-side host 2 issues a communication request command for OUT transmission, which is in turn written in the register section 23 (the command register) via the host I/F 27. As a result, the power transmission side shifts into the communication mode to switch the transmission and communication conditions for the normal power transmission to the conditions for the communication mode and turn off determination processing for periodic authentication.

The issued communication request command (a command packet) for the OUT transmission is transmitted from the power transmission side (the primary side) to the power receiving side (the secondary side) by contactless power transmission (frequency modulation). Upon reception of the communication request command, the power receiving side shifts into the communication mode and turns off a power feeding transistor (TB2) to stop power feeding to the load 90. In addition, the power receiving side turns off a sending processing of periodic authentication. In this manner, stopping power feeding to the load 90 can prevent fluctuation of the load 90 from having negative influence on load modulation for data communication, in the communication mode.

In addition, the power receiving side notifies reception of the communication request command to the power receiving-side host 4 by using the register section 53. Thereby, the host 4 can know the reception of the communication request for OUT transmission from the power transmission side.

Figure 5A:
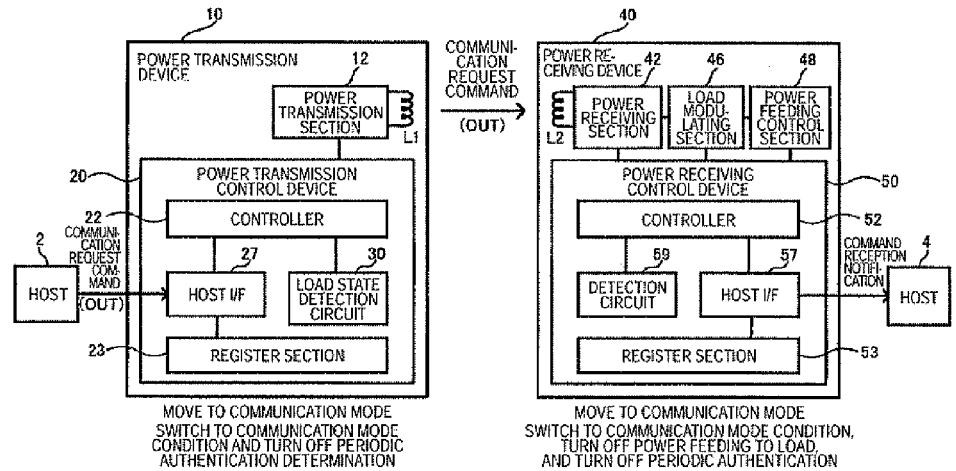
FIGS. 5A to 5C are illustrations showing the operation of the devices according to the embodiment.
Figure 5B:
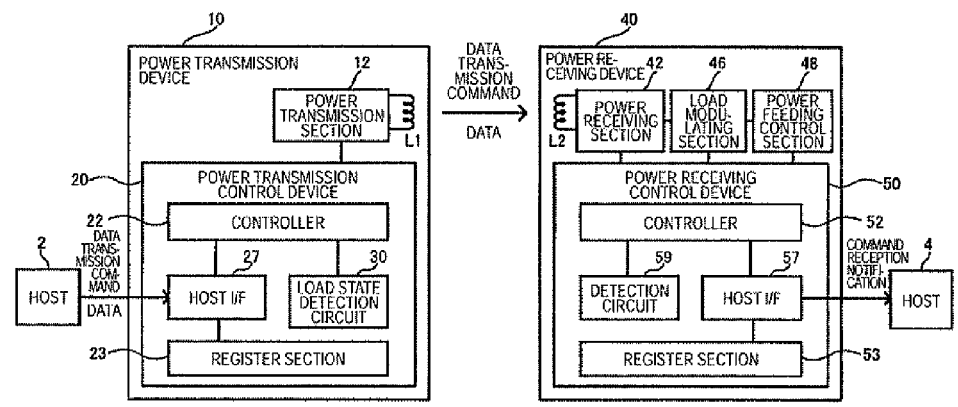

Next, as shown in FIG. 5B, to execute OUT transmission for transmitting data from the power transmission side to the power receiving side, the power transmission-side host 2 writes a data transmission command and corresponding data in the register section 23 (the command register and the data register) via the host I/F 27. Then, the data transmission command and the data are transmitted from the power transmission side to the power receiving side by the contactless power transmission (frequency modulation).

When receiving the data transmission command, the power receiving side notifies the reception of the data transmission command to the host 4 by using the register section 53 (the interruption register). This allows the host 4 to know that the power receiving side has received the data from the power transmission side.

Figure 5C:
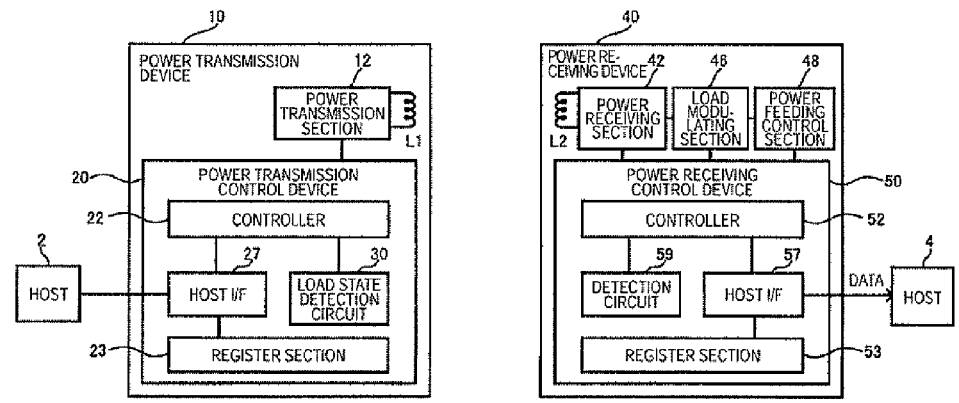

Next, as shown in FIG. 5C, the host 4 reads out the data written in the register section 53 (the data register) via the host I/F 57. Thereby, OUT transmission is accomplished that transmits the data from the host 2 to the host 4 by using the contactless power transmission.

Figure 6A:
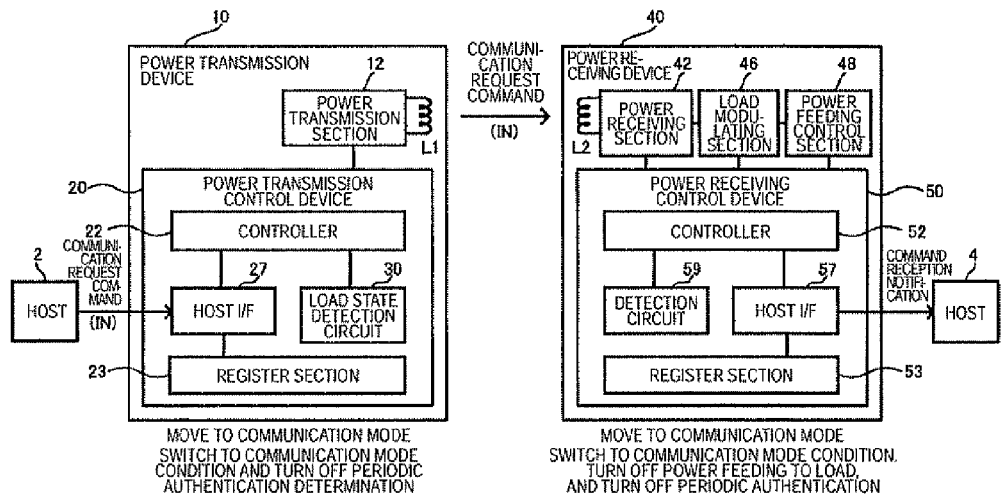
FIGS. 6A to 6C are illustrations showing the operation of the devices according to the embodiment.

Meanwhile, in FIG. 6A, the power transmission-side host 2 issues a communication request command for IN transmission, which is in turn written in the register section 23 (the command register) via the host I/F 27. Thereby, the power transmission side shifts into the communication mode.

The issued communication request command for IN transmission is transmitted from the power transmission side to the power receiving side by contactless power transmission. The power receiving side receiving the communication request command shifts into the communication mode and notifies reception of the communication request command to the power receiving-side host 4 by using the register section 53. This allows the host 4 to know the reception of the communication request for IN transmission from the power transmission side.

Figure 6B:
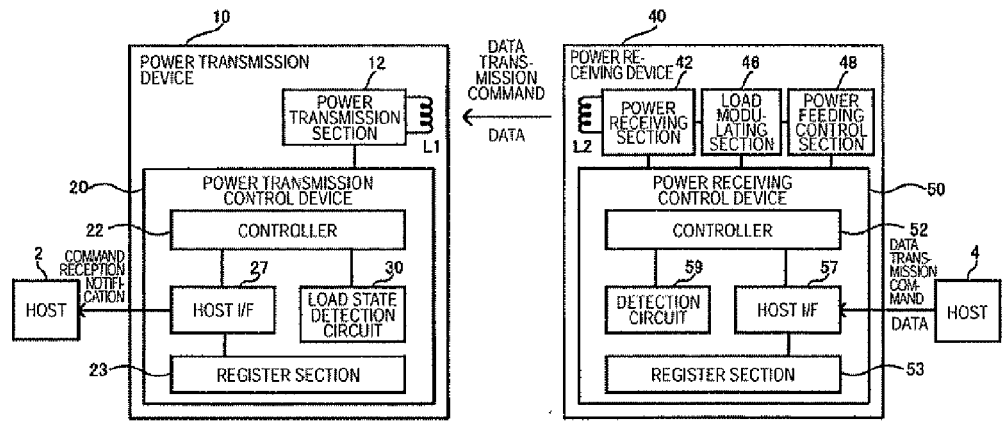

Then, as shown in FIG. 6B, to execute IN transmission for transmitting data from the power receiving side to the power transmission side, the host 4 writes a data transmission command and corresponding data in the register section 53 via the host I/F 57. The data transmission command and the data are transmitted from the power receiving side to the power transmission side by contactless power transmission (load modulation).

The power transmission side receiving the data transmission command notifies reception of the data transmission command to the power transmission-side host 2 by using the register section 23. This allows the host 2 to know that the power transmission side has received the data from the power receiving side.

Figure 6C:
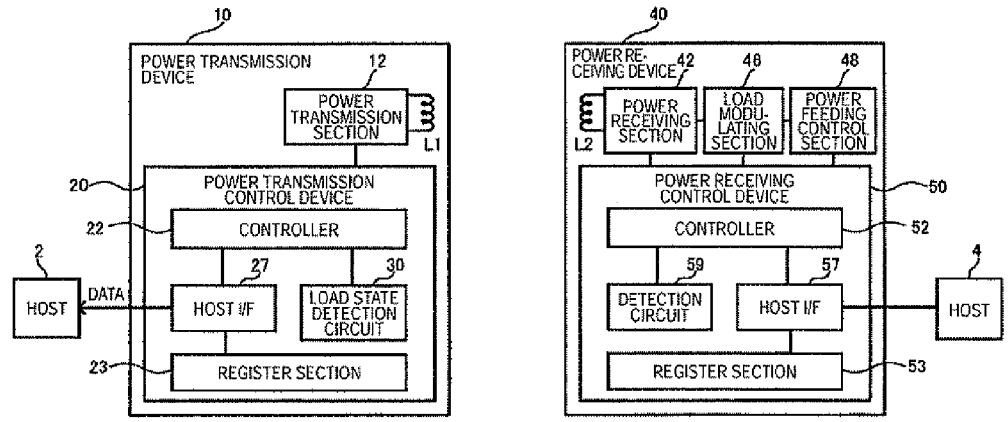

Then, as shown in FIG. 6C, the host 2 reads out the data written in the register section 23 via the host I/F 27. Thereby, IN transmission is accomplished that transmits the data from the host 4 to the host 2 by using the contactless power transmission.

Figure 7:
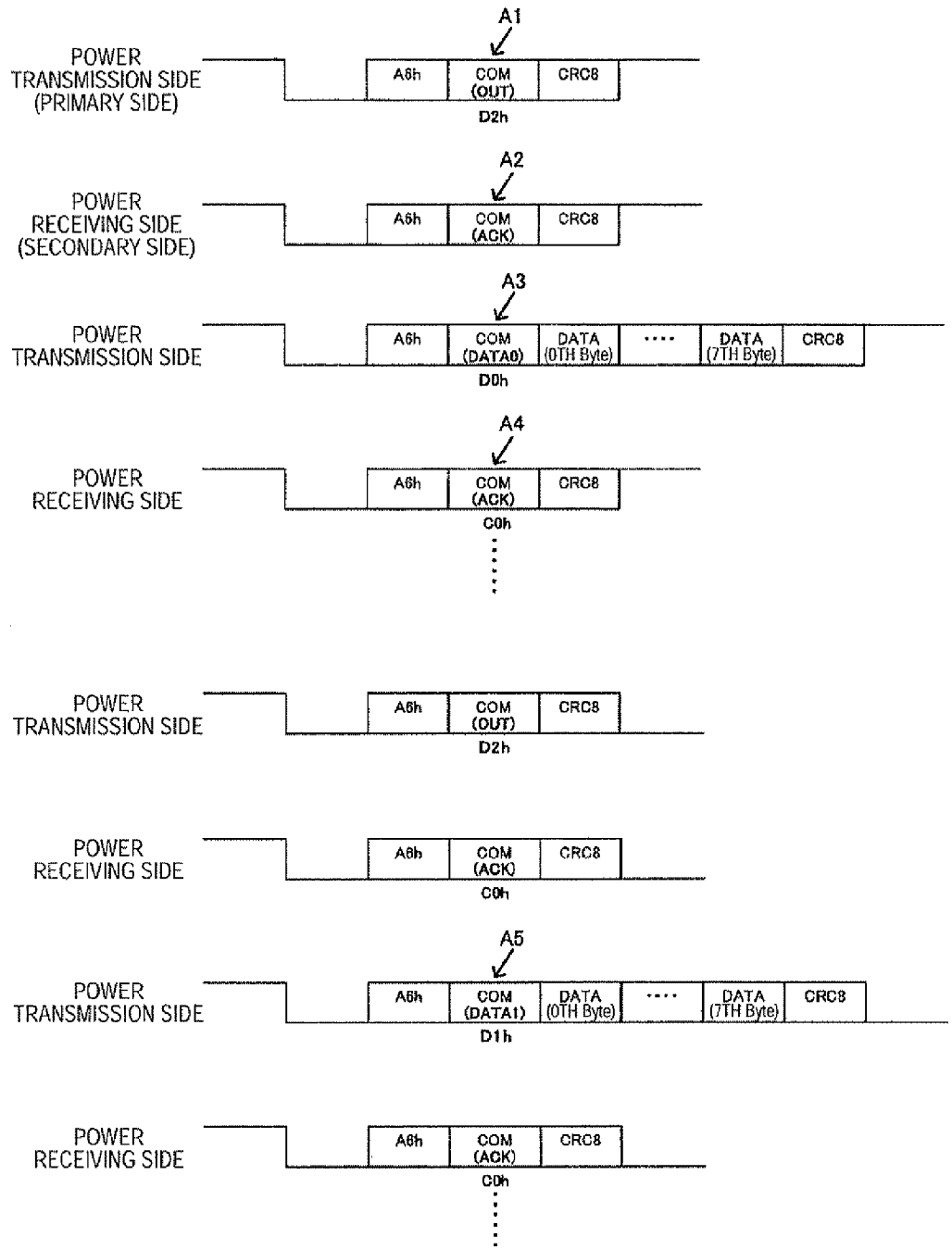
FIG. 7 is a diagram of a signal waveform example illustrating OUT transmission.

FIG. 7 depicts examples of signal waveforms more specifically illustrating the OUT transmission described with reference to FIGS. 5A to 5C.

At A1 indicated in FIG. 7, the power transmission side transmits an OUT transmission command as the communication request command to the power receiving side by the contactless power transmission (frequency modulation) (See FIG. 5A). In the drawing, A6$h$ and CRC8, respectively, represent a start code and a CRC code, respectively.

Upon reception of the OUT transmission command, the power receiving side transmits an ACK command to the power transmission side, as indicated at A2 of FIG. 7. The ACK command is a handshake command corresponding to the OUT transmission command. With the ACK command, the power transmission-side host 2 can confirm that the power receiving-side host 4 has appropriately received the OUT transmission command.

Next, as indicated at A3 of FIG. 7, after receiving the ACK command, the power transmission side transmits the data transmission command (DATA0) and the corresponding data to the power receiving side (See FIG. 5B). Then, as indicated at A4, the power receiving side transmits an ACK command corresponding to the data transmission command to the power transmission side. With the ACK command, the power transmission-side host 2 can confirm that the power receiving-side host 4 has appropriately received the data.

The transmission processings as above are repeated until a required number of data can be obtained, thereby accomplishing OUT transmission that transmits a desired number of data from the power transmission-side host 2 to the power receiving-side host 4.

At A3 and A5 of FIG. 7, the power transmission side transmits by toggling between data transmission commands (DATA0) and (DATA1), thereby improving reliability of data transmission. Additionally, in FIG. 7, the power transmission side may issue an OUT transmission command only once. Specifically, when the power transmission side transmits an OUT transmission command and the power receiving side transmits an ACK command in response to the command, the power transmission side transmits a data transmission command (DATA0) and data. Then, when the power receiving side transmits an ACK command, the power transmission side transmits a data transmission command (DATA1) and data, without transmitting any OUT transmission command. The processings are repeated until a required number of data can be obtained.

Figure 8:
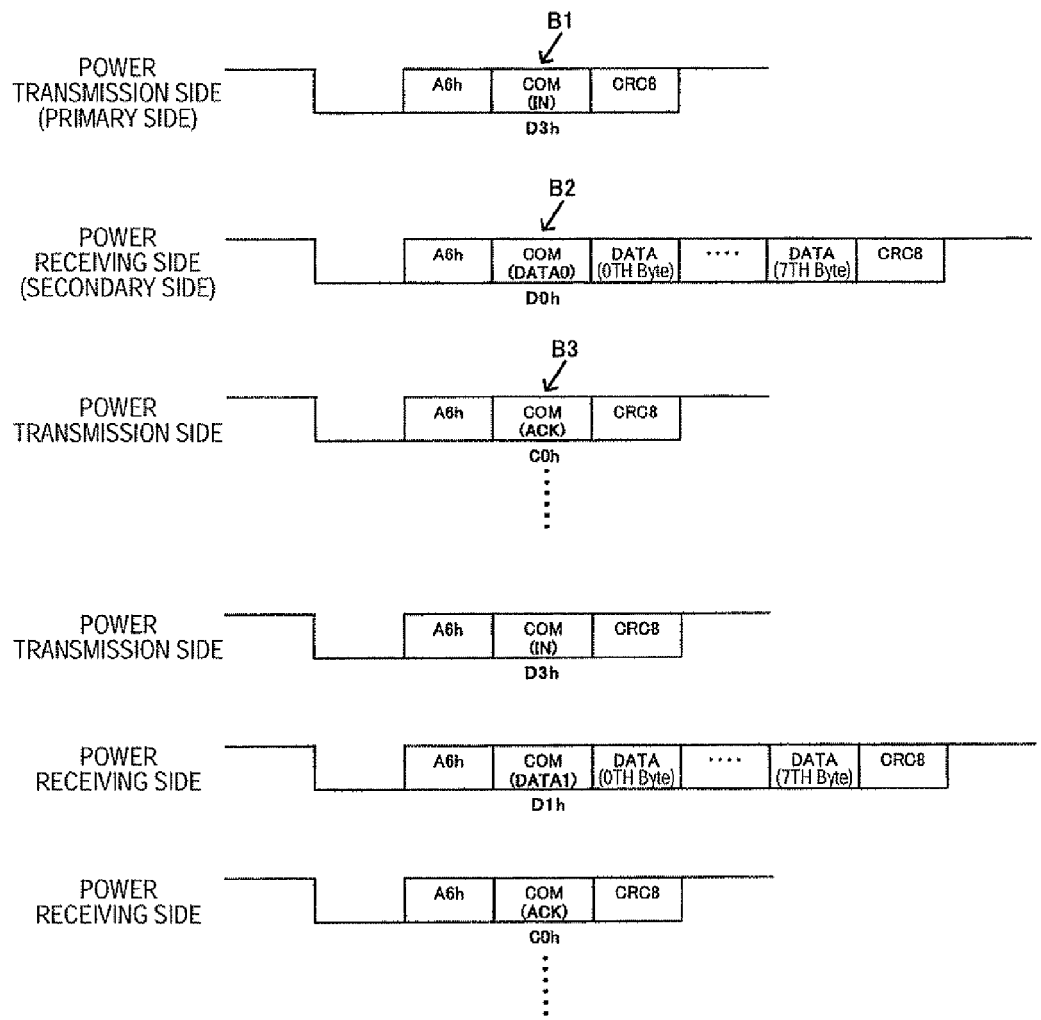
FIG. 8 is a diagram of a signal waveform example illustrating IN transmission.

FIG. 8 depicts examples of signal waveforms more specifically illustrating the IN transmission described with reference to FIGS. 6A to 6C.

At B1 of FIG. 8, the power transmission side transmits an IN transmission command as the communication request command to the power receiving side by the contactless power transmission (frequency modulation) (See FIG. 6A).

Upon reception of the IN transmission command, the power receiving side transmits a data transmission command (DATA0) and corresponding data to the power transmission side, as indicated at B2 of FIG. 8 (See FIG. 6B). Then, as indicated at B3, the power transmission side transmits an ACK command corresponding to the data transmission command to the power receiving side. With the ACK command, the power receiving-side host 4 can confirm that the power transmission-side host 2 has appropriately received the data.

The transmission processings as above are repeated until a required number of data can be obtained, thereby accomplishing IN transmission that transmits a desired number of data from the power receiving-side host 4 to the power transmission-side host 2.

At each of A2 and A4 of FIG. 7 and B3 of FIG. 8, handshaking using the ACK command is provided. However, without any handshaking, OUT transmission and IN transmission may be accomplished.

4. Register Map

Next, a register map of the embodiment will be described. FIG. 9 is a table showing an example of the register map regarding the register section 23 of the power transmission side.

SoftReset is a bit allowing the host 2 to direct a soft reset and OUTxIN is a bit switching between a transmission buffer and a reception buffer.

The status register 112 is a register for confirming a power transmission (charging) state, a standby state, or a communication state by reading out the status register 112 by the power transmission-side host 2.

For example, a bit PriBusy of the status register 112 becomes 1 immediately after a command issue request by the power transmission-side (the primary-side) host 2, whereas the bit becomes 0 upon completion of command packet transmission by inter-coil communication (contactless power transmission). To start transmission from the power transmission side to the power receiving side, it is confirmed whether the bit is 0 or not.

A bit SecReq becomes 1 immediately after reception of a command from the power receiving side (the secondary side) by inter-coil communication and the bit returns to 0 after completion of the reception. Transmission from the power receiving side to the power transmission side is started after confirming that the bit SecReq is 0. A bit ChgErr becomes 1 when it is determined that an error has occurred during power transmission to the power receiving side, by detecting breakdown of a power transmission driver, temperature abnormality, or low voltage. Resetting is necessary to recover the bit from the occurrence of the error.

A bit FullChg becomes 1 immediately after shifting into full-charge mode because of reception of a full charge detection command (a save command) from the power receiving side, whereas the bit returns to 0 after shifting into a recharge confirmation mode. A bit ComSel indicates a state in which a power transmission-side sequencer is in charge mode (normal power transmission mode) and branching by command selection is possible. DrvOn is a bit indicating a power transmission state where the coils are being driven by the power transmission side.

A bit SetUp becomes 1 after the power transmission side shifts into setup processing, which will be described below. The bit returns to 0 upon communication mode, thus indicating whether parameters of current conditions for transmission and communication correspond to normal power transmission (charging) or communication mode. A bit NegoTran becomes 1 after the power transmission side shifts to negotiation processing, which will be described below.

Among the bits of the status register 112, for example, the bits ChgErr, FullChg, ComSel, and DrvOn allow the host 2 to confirm a power transmission state in the contactless power transmission. In addition, among them, for example, the FullChg and the ComSel are bits that confirm a charge state of the battery 94.

The command register 114 is a register for transmitting a command packet from the power transmission side to the power receiving side by allowing the host 2 to write a command in the register 114 in a command branching phase. When a command is written in the register 114, a check of periodic authentication is masked, and a power transmission condition and a communication condition are switched from those for normal power transmission (charge) to those for the communication mode (a communication-capable condition/a negotiation condition), thereby transmitting the command. Upon completion of the command transmission, the bit of the register 114 returns to 0, whereby the host 2 can confirm that the command transmission was completed.

For example, a bit ReChgSend of the command register 114 is used to transmit a packet of a normal power transmission start command (a charge start command) to the power receiving side by inter-coil communication. To transmit the packet, for example, the bit is set to 1. Similarly, ACKSend, Data1Send, Data0Send, OutSend, and InSend, respectively, are bits transmitting an ACK command, a DATA1 command, a DATA0 command, an OUT transmission command, and an IN transmission command, respectively to the power receiving side.

The interruption register 116 includes an interruption enable register and an interruption status register. The interruption enable register permits or prohibits assertion of interruption notification. Setting a corresponding bit to 1 permits an interruption to the host 2. In addition, the interruption status register indicates an interruption status. When there occurs a status where an interruption is permitted by the interruption enable register, the status becomes an interruption factor.

EnINTComRcv of the interruption enable register is a bit that permits an interruption upon reception of an INT command (an interruption command) from the power receiving side. Similarly, EnDt1ComRcv, EnDt0ComRcv, EnSTALLComRcv, EnNAKComRcv, and EnACKComRcv, respectively, are bits permitting an interruption upon reception of a DATA1 command, a DATA0 command, a STALL command, a NAK command, and an ACK command, respectively. In addition, EnErrComRcv is a bit that permits an interruption in case of the occurrence of an error in a command packet received, and EnReChgOn is a bit that permits an interruption at a timing for starting normal power transmission (starting charge).

A bit INTComRcv of the interruption status register becomes 1 upon reception of an INT command from the power receiving side. Similarly, bits Dt1ComRcv, Dt0ComRcv, STALLComRcv, NAKComRcv, and ACKComRcv, respectively, become 1 upon reception of a DATA1 command, a DATA0 command, a STALL command, a NAK command, and an ACK command, respectively. In addition, a bit ErrComRcv becomes 1 in case of the occurrence of an error in a command packet (frame) received, and a bit ReChgOn becomes 1 in synch with the timing for starting normal power transmission (starting charge).

Among the bits of the interruption register 116 mentioned above, for example, the bits INTComRcv, Dt1ComRcv, Dt0ComRcv, STALLComRcv, NAKComRcv, and ACKComRcv are used to notify the reception of a command from the power receiving side. The bit ReChgOn notifies start of charging of the battery 94 to the power transmission-side host 2, whereby the host 2 can know the timing for starting charging of the battery 94.

When the power transmission-side host 2 issues an OUT transmission command or an IN transmission command as a communication request command to write the command in the register section 23, the power transmission side shifts into the communication mode. Similarly, when receiving an INT command as an interruption command for communication request issued by the power receiving-side host 4, the bit INTComRcv becomes 1, whereby the power transmission side shifts into the communication mode.

The data register 118 has a data buffer composed of bits from TranBuf_0 to TranBuf_7. In data transmission, following DATA0 or DATA1 as a data transmission command, data preset in the data register 118 are sent out in an order from TranBuf_0 to TranBuf_7. Additionally, in data reception, following the command DATA0 or the DATA1, received data are stored in the data register 118 in the order from TranBuf_0 to TranBuf_7.

RcvMsg is a buffer for receiving message data of an INT command in inter-coil communication. Predetermining a content of the message data of the INT command between the hosts enables a content (such as a data type) of an interrupt request of the power receiving side to be informed.

FIG. 10 is a diagram showing an example of a register map of the register section 53 in the power receiving side.

The status register 132 is used to allow the power receiving-side host 4 to confirm a power transmission (charging) state, a standby state, or a communication state by reading out the status register 132.

For example, a bit SecBusy of the status register 132 becomes 1 immediately after a command issue request by the power receiving-side (the secondary-side) host 4, whereas the bit becomes 0 upon completion of command packet transmission by inter-coil communication (contactless power transmission). After an issue of an INT command, the bit is maintained to be 1 until an ACK command returns from the power transmission side.

A bit PriReq becomes 1 immediately after reception of an IN/OUT transmission command from the power transmission side (the primary side) by inter-coil communication, and the bit returns to 0 when a series of data transmission is completed and the power transmission side returns a response command in response to a normal power transmission start command.

A bit ComSel indicates that a power receiving-side sequencer is in charge mode (normal power transmission mode) and branching by command selection is possible. FullChg is a bit indicating that the battery 94 is in a fully charged state and a full charge detection command (a save command) can be issued.

Among the bits of the status register 132, for example, the ComSel and the FullChg are bits that allow the host 4 to confirm the charging state of the battery 94.

The host 4 writes a command into the command register 134 in a command branch phase to transmit a command packet from the power receiving side to the power transmission side. When the command is written in the register 134, power transmission and communication conditions for normal power transmission are switched to those for the communication mode, thereby transmitting the command. Then, upon completion of the command transmission, the bit of the register returns to 0, whereby the host 4 can confirm the completion of the transmission.

For example, in the command register 134, bits STALLSend, NAKSend, ACKSend, Data1Send, Data0Send, INTsend, and STOPSend, respectively, are used to transmit an STALL command packet, an NAK command packet an ACK command packet, a DATA1 command packet, a DATA0 command packet, an INT command packet (with message data), and an STOP command packet, respectively, by inter-coil communication. For example, setting those bits to 1 allows execution of the transmission.

The interruption register 136 has an interrupt enable register and an interrupt status register. EnReChgRcv, EnDt1ComRcv, EnDt0ComRcv, EnINComRcv, EnOUTComRcv, and EnACKComRcv, respectively, of the interrupt enable register are bits permitting an interrupt upon reception of an RECHG command (a normal power transmission start command), a DATA1 command, a DATA0 command, an IN transmission command, an OUT transmission command, and an ACK command. A bit ENICutXOn permits an interrupt at the rising of an output of a direction signal ICUTX for load reduction in periodic authentication. A bit EnReChgOn permits an interrupt at the timing for starting normal power transmission (starting charge).

In the interrupt status register, bits ReChgRcv, Dt1ComRcv, Dt0ComRcv, INComRcv, OUTComRcbv, and ACKComRcv, respectively, become 1 upon reception of a RECHG command, a DATA1 command, a DATA0 command, an IN transmission command, an OUT transmission command, and an ACK command, respectively. A bit ICutXOn becomes 1 at the rising of an output of the signal ICUTX for load reduction in periodic authentication. A bit ReChgOn becomes 1 in synch with the timing for starting normal power transmission (starting charging).

Among the bits of the interruption register 136 above, for example, the bits ReChgRcv, Dt1ComRcv, Dt0ComRcv, TNComRcv, OUTComRcv, and ACKComRcv notify the reception of a command from the power transmission-side host 2 to the power receiving-side host 4. The bit ReChgOn notifies the start of charging of the battery 94 to the power receiving-side host 4, whereby the host 4 can know the charge start timing of the battery 94.

The bits OUTComRcv and INComRcv become 1 upon reception of the OUT/IN transmission command as a communication request command issued by the power transmission-side host 2, whereby the power receiving side shifts into a communication mode. Similarly, when the power receiving-side host 4 issues an INT command as an interruption command for communication request, the power receiving side shifts into the communication mode.

The data register 138 has a data buffer composed of bits from TranBuf_0 to TranBuf_7. In data transmission, following a command DATA0 or DATA1 as a data transmission command, data preset in the data register 138 are sent out in an order from TranBuf_0 to TranBuf_7. Additionally, in data reception, following the command DATA0 or the DATA1, received data are stored in the data register 138 in the order from TranBuf_0 to TranBuf_7. In addition, SendMsg is a buffer for storing the message data of the INT command in the inter-coil communication.

5. Communication Between Host and Host I/F

Next, communication between one of the hosts and the host I/F will be described by referring to FIGS. 11A and 11B. The drawings show examples using the I2C communication method.

Figure 11A:
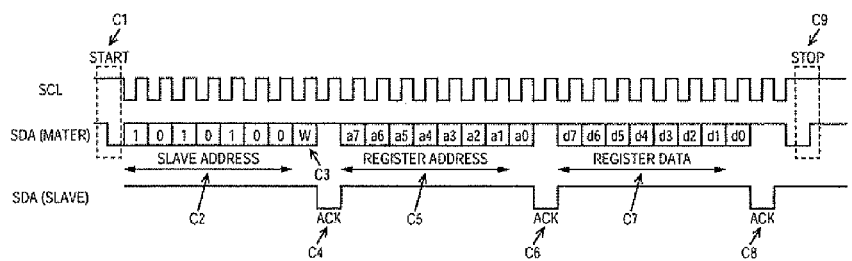
FIGS. 11A and 11B are illustrations showing an example of a communication method between a host and a host I/F.

In the example of FIG. 11A, a MASTER (the host) writes data into a SLAVE (the power transmission control device or a power receiving control device). As shown in C1 of FIG. 11A, when a serial clock signal SCL is at H level, the MASTER changes serial data signal SDA from H level to L level to start communication. Then, as in C2, the MASTER designates an address of the SLAVE and sets the signal SDA to L level at a last bit, as in C3, thereby informing about writing operation.

When the slave address is of the SLAVE, the SLAVE sets the SDA to L level as in C4 to return a signal ACK to the MASTER. Then, as shown in C5, the MASTER designates an address of a register in which the data is to be written. Next, as in C6, the SLAVE returns a signal ACK to the MASTER, and then, as shown in C7, the MASTER sends out write data as register data to be written at the register address. The SLAVE returns a signal ACK, as in C8. Next, as in C9, when the SCL is at H level, the MASTER changes the SDA from L level to H level to finish the communication.

Figure 11B:
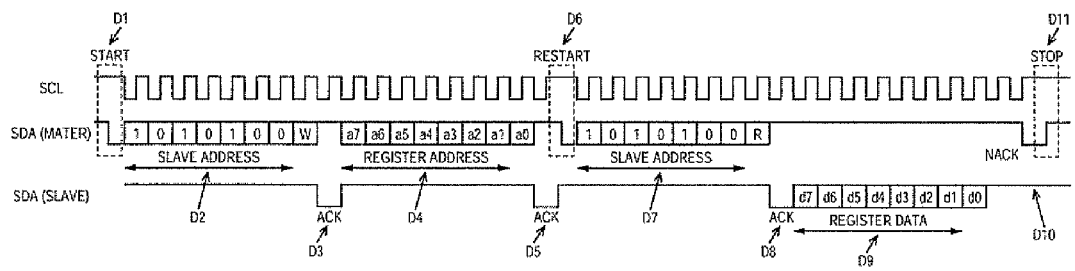

FIG. 11B shows an example in which the MASTER reads out data from the SLAVE. In FIG. 11B, following START shown in D1, the MASTER designates a slave address as shown in D2. When the SLAVE returns a signal ACK as in D3, the MASTER designates a register address, as in D4.

Next, as shown in D5, when the SLAVE returns a signal ACK, the MASTER restarts, as in D6. Then, as in D7, the MASTER designates a register address. The SLAVE sets the SDA to L level and returns a signal ACK, as in D8 and thereafter, as in D9, sends out read data as register data. Next, as shown in D10, when the slave returns a signal NAK, the MASTER finishes the communication, as in D11.

6. Processing Sequence in Contactless Power Transmission

Along with dissemination of contactless power transmission, various types of secondary coils of a power receiving side are expected to be available on the market. In other words, as electronic apparatuses as the power receiving side, such as a mobile phone, different in configuration and size, secondary coils incorporated in power receiving devices of the electronic apparatuses also have various configurations and sizes according to the difference. In addition, for contactless power transmission, the electronic apparatuses require different amounts of electrical power (watt) and output voltages, so that inductances of the secondary coils become also different.

On the other hand, in contactless power transmission, power transmission takes place even if configurations, sizes, and the like of primary and secondary coils are not completely compatible with each other. In this respect, charging using a cable in wired communication can prevent such a problem by devising a shape or the like of a cable connector, whereas it is difficult for contactless power transmission to do so.

Currently, contactless power transmission is achieved by different methods among individual manufacturers.

However, to facilitate the dissemination of contactless power transmission and ensure safety necessary for the dissemination, it is desirable to execute a processing sequence of contactless power transmission having high general versatility.

Figure 12:
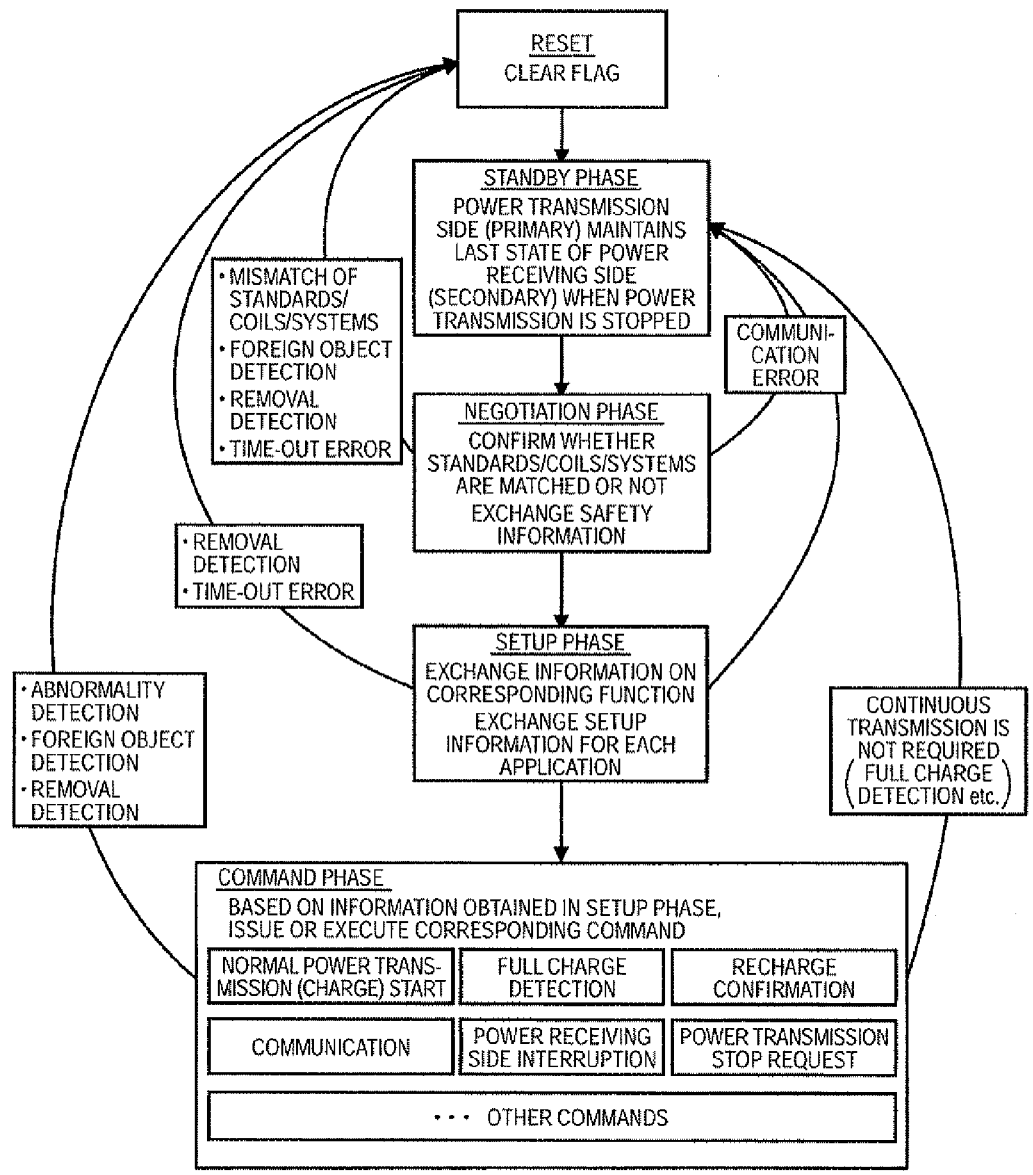
FIG. 12 is an illustration showing a processing sequence of the contactless power transmission.

FIG. 12 is a schematic diagram showing an outline of a processing sequence of the contactless power transmission achieved by the embodiment.

In the processing sequence, after a reset state, the power transmission side and the power receiving side shift into a standby phase. In the reset state, flags maintained by the power transmission side (the primary side) and the power receiving side (the secondary side) are cleared. The flags represent states of the power transmission device and the power receiving device (states of power transmission, full charge, recharge confirmation, and the like) and are maintained by the register sections of the devices.

In the standby phase, the power transmission side (the primary side) maintains a last state of a time when the power receiving side is stopped (when power transmission is stopped). For example, by detection of full charge of the battery, the power transmission side and the power receiving side shift into a standby phase after detection of full charge. In this case, it is necessary to detect reduction in a battery voltage to execute recharge. Thus, the power transmission side stores information in which a factor of the power transmission stop is the detection of full charge. Specifically, the power transmission side maintains a setup of the recharge confirmation flag without clearing the flag and periodically confirms whether recharge is required or not.

In the standby phase, power transmission from the power transmission side to the power receiving side is stopped, whereby the power receiving side is also stopped due to no supply of a power supply voltage, whereas the power transmission side is in an operation state due to supply of the power supply voltage. Accordingly, in the standby state, stopping the operation of the power receiving side can lead to reduction of power consumption. In addition, at that timer the power transmission side maintains the flags representing various states without clearing them, and thus, can execute various processings by using those flags after the standby phase.

The power transmission side and the power receiving side shift into a negotiation phase after the standby phase. The negotiation phase includes execution of negotiation processings, such as confirmation of match or mismatch of standards/coils/systems and exchange of safety information. Specifically, the power transmission side and the power receiving side exchange standard/coil/system information to confirm whether standards/coils/systems of both sides are compatible with each other or not. In addition, for example, the power receiving side transmits information about a safe threshold for detecting a foreign object or the like to the power transmission side to exchange safety information. In the negotiation processing, the power transmission side and the power receiving side mutually confirm whether information can be transmitted or not, whether the transmitted information is relevant or not, whether a load state of the power receiving side is appropriate or not (whether any foreign object was detected or not), and the like.

In the negotiation processing, for example, the standards/the coils/the systems of both sides may be determined to be mismatched; a foreign object may be detected; removal of any apparatus may be detected; or a time-out error may occur and thus, the negotiation phase may be reset, thereby clearing flags. In case of the occurrence of a communication error or the like, for example, the negotiation phase is shifted into the standby phase, where no flag is cleared.

The power transmission side and the power receiving side shift into setup phase after the negotiation phase. The setup phase includes execution of setup processing for transmitting setup information such as information of corresponding function and setup information for each application. For example, based on a result of the negotiation processing, authentication processing is executed to specify a transmission condition. Specifically, when the power receiving side transmits transmission condition information including a driving voltage and a driving frequency of the coil to the power transmission side, the power transmission side sets a transmission condition for normal power transmission, such as the coil's driving voltage and frequency, based on the received transmission condition information. In addition, an exchange of the information of corresponding function and an exchange of the setup information different among upper-level applications are executed in the setup processing. Specifically, the setup processing executes an exchange of threshold information for load state detection of the power receiving side after start of normal power transmission (e.g. threshold information for data communication and foreign object detection) and information regarding types of commands issuable and executable by the power receiving side and an additional corresponding function including a communication function and a periodic authentication function. This allows the exchange of setup information different according to applications of various types, models, or like of electronic apparatuses (such as mobile phones and audio equipment).

In the setup processing, when the removal of any apparatus is detected or a time-out error occurs, the setup phase is shifted into the reset state. In case of the occurrence of a communication error, the phase is shifted to the standby phase.

Following the setup phase, the power transmission side and the power receiving side shift into a command phase. In the command phase, command processing is executed based on the information obtained by the setup processing. The command processing includes issuing or execution of corresponding commands (the commands that were confirmed to be issuable and executable in the setup processing). Examples of commands executed in the command processing include a normal power transmission (charge) start command, a full charge detection (notification) command, a recharge confirmation command, a communication command, a power receiving-side interruption command, and a power transmission stop request command.

For example, normal power transmission is prepared through the negotiation processing and the setup processing. Then, the power transmission side transmits (issues) the normal power transmission (charging) start command to the power receiving side, and the power receiving side receives the command and transmits a response command to the power transmission side, thereby starting normal power transmission. After starting the normal power transmission, when full charge is detected in the power receiving side, the power receiving side transmits the full charge detection command to the power transmission side.

As in the full charge detection, if continuous transmission is not required, the phase is shifted to the standby phase after detection of full charge. Then, again, through the negotiation processing and the setup processing, the power transmission side transmits the recharge confirmation command to the power receiving side. Thereby, the power receiving side checks a battery voltage to determine whether recharge is necessary or not. If recharge is necessary, a recharge confirmation flag is reset and the phase is shifted to the negotiation phase to execute the authentication processing and the setup processing. Then, the power transmission side issues the normal power transmission start command to restart normal power transmission. Conversely, if recharge is unnecessary, while maintaining the recharge confirmation flag in a setting state, the phase is returned to the standby phase after detection of full charge.

In the command processing, if any abnormality, any foreign object, a removal of any apparatus is detected, the command phase is shifted into the reset state.

Figure 13:
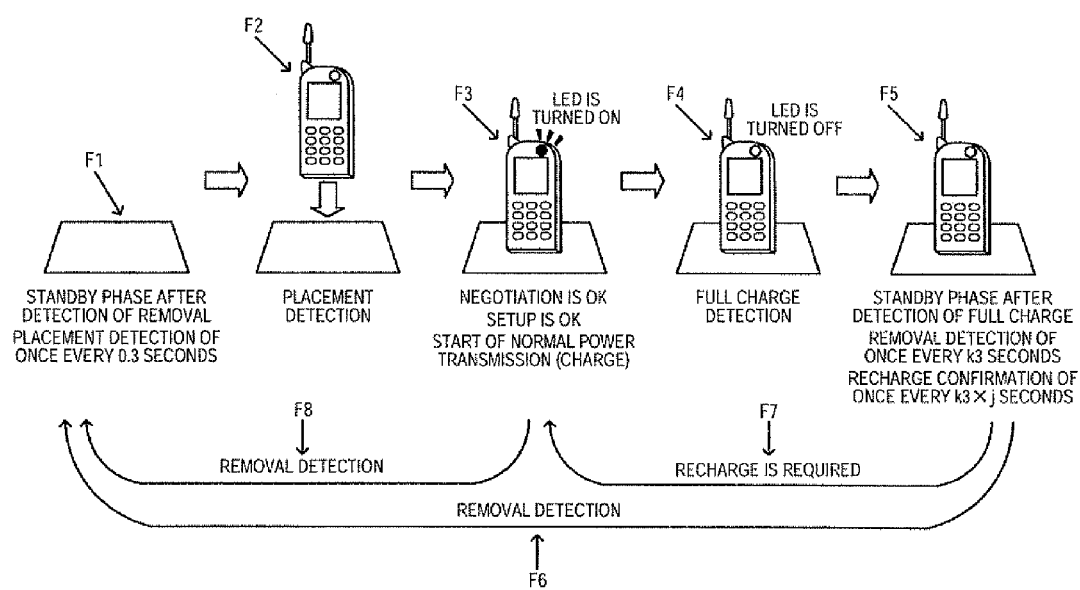
FIG. 13 is a more specific illustration showing the processing sequence of the contactless power transmission.

With reference to FIG. 13, the processing sequence of the embodiment will now be described in more detail. In a standby phase after detection of removal shown in F1, for example, placement detection is executed once every k1 second(s). Next, as shown in F2, when placement (installation) of an electronic apparatus is detected, the negotiation processing and the setup processing are executed. Next, as shown in F3, after the processings for negotiation and setup are normally completed, the normal power transmission start command is issued in the command processing, whereby normal power transmission is started, and then, charging of the electronic apparatus is started. Next, as shown in F4, when full charge is detected, an LED of the electronic apparatus lights out, and as in F5, the processing phase is shifted into the standby phase after the detection of full charge.

In the standby phase after detection of full charge, for example, detection of removal is executed once every k3 seconds, as well as confirmation of recharge is executed once every k3×j seconds. Then, as shown in F6, when a removal of the electronic apparatus is detected in the standby phase after detection of full charge, the processing phase is shifted into the standby phase after the detection of removal. On the other hand, as shown in F7, if recharge is determined to be necessary by the confirmation of recharge in the standby phase after detection of full charge, the negotiation processing and the setup processing are executed, whereby normal power transmission is restarted, followed by recharging of the battery. As in F8, if a removal of the electronic apparatus is detected during the normal power transmission, the processing phase is shifted into the standby phase after the detection of removal.

The system information transmitted in the negotiation phase indicates a detection system of the load state in each of the power transmission side and the power receiving side. Examples of the load state detection system include a pulse-width detection system (a phase detection system), a current detection system, a peak voltage detection system, and a combination system thereof. The system information is information indicating which one of the systems is used in each of the power transmission side and the power receiving side.

A foreign-object threshold is safety threshold information. For example, the foreign object threshold is stored in the power receiving side, and is transmitted from the power receiving side to the power transmission side before the start of normal power transmission. Then, based on the foreign object threshold, the power transmission side executes primary foreign-object detection as a foreign object detection before the start of normal power transmission. For example, to detect the load state of the power receiving side by using the pulse-width detection system, a threshold of a pulse width count value as the foreign object threshold is sent from the power receiving side to the power transmission side. Based on the threshold of the count value, the power transmission side executes the primary foreign object detection by the pulse-width detection system. In this manner, in the preset embodiment, the threshold information for detecting the load state of the power receiving side before the start of normal power transmission is transmitted from the power receiving side to the power transmission side in the negotiation processing. Meanwhile, the threshold information for detecting the load state of the power receiving side after the start of normal power transmission is transmitted from the power receiving side to the power transmission side, for example, in the setup processing.

In the processing sequence of the embodiment described above, for example, the negotiation processing determines compatibility regarding the standards, the coils, and the systems of the power transmission side and the power receiving side and exchanges minimum safety information. Additionally, the negotiation processing determines as to whether communication is possible or not, whether communication information is appropriate or not, and whether the load state of the power receiving side is appropriate or not.

The setup processing includes setup of a transmission condition necessary for normal power transmission, such as setup of the driving voltage and driving frequency of the coil. Additionally, the information regarding a threshold for the load state detection after the start of normal power transmission is transmitted, as well as the additional corresponding function information and the setup information necessary for each of higher-level applications are exchanged in the setup processing.

In the command phase through the setup processing and the negotiation processing, command processing is executed. The command processing includes issuing and execution of commands that were confirmed to be issuable and executable in the negotiation processing and the setup processing.

In this manner, a minimum information exchange necessary to secure the system's compatibility and safety is executed in the negotiation processing, and the exchange of setup information different among applications is executed in the setup processing. Accordingly, incompatible information between the power transmission side and the power receiving side is excluded in the negotiation processing, so that there is no need for transmission of a large amount of setup information. Thus, in the negotiation processing, since it is only necessary to transmit minimum information, an amount of information to be transmitted can be reduced. As a result, the negotiation phase can be completed in a short time, thereby improving processing efficiency.

In addition, between the apparatuses of the power transmission side and the power receiving side, the negotiation processing allows minimum contactless power transmission, and the exchange of the setup information allows function extension of each apparatus. Consequently, for each apparatus, the negotiation processing can execute a minimum setting necessary for a contactless power transmission system, and the setup processing allows system optimization, thereby achieving a flexible system construction.

The power transmission side receives the threshold information and the system information from the power receiving side and can execute contactless power transmission and detection of a foreign object merely by setting the threshold information and the system information received, thus enabling the power transmission-side processing to be simplified. In this case, the power receiving side transmits an appropriate combination of coil information and threshold information to the power transmission side, thereby enabling contactless power transmission to be appropriately and safely achieved.

7. Detailed Structural Example

Figure 14:
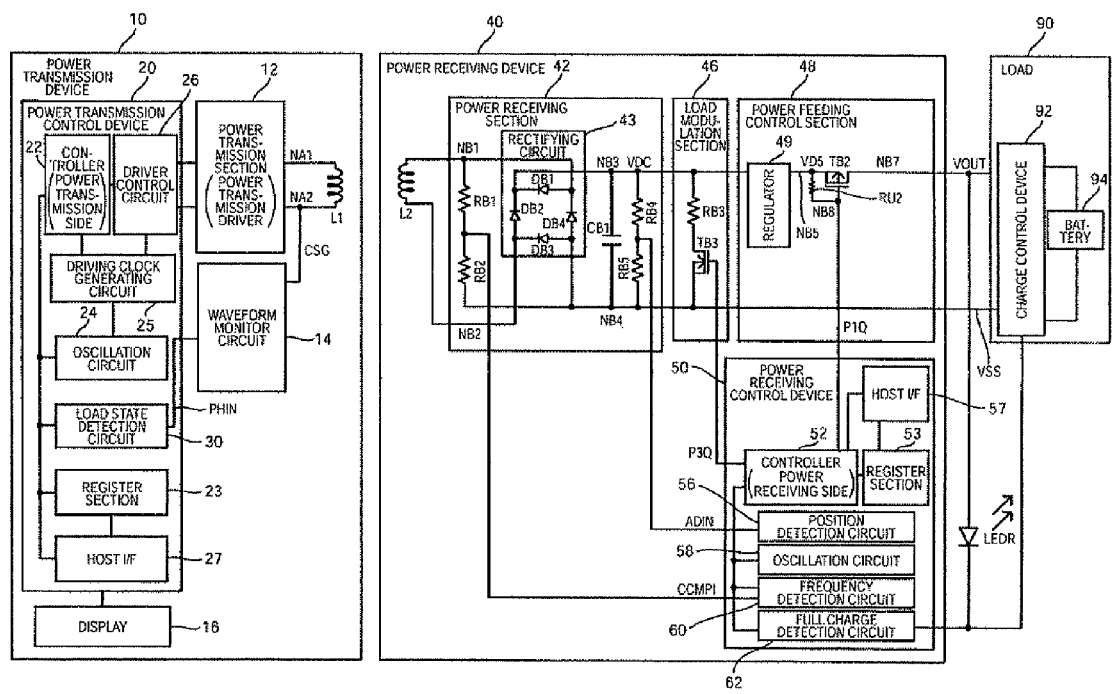
FIG. 14 is a detailed structural example of the contactless power transmission system including the devices according to the embodiment shown in FIG. 2.

FIG. 14 is a diagram showing a detailed structural example of the embodiment. Hereinbelow, constituent elements described with reference to FIG. 2 will be denoted by same reference numerals and descriptions thereof will be omitted according to needs.

Based on a coil end signal CSG of the primary coil L1, a waveform monitor circuit 14 generates an induced voltage signal PHIN for waveform monitoring. For example, the coil end signal CSG as the induced voltage signal of the primary coil L1 sometimes exceeds a maximum rated voltage of the IC of the power transmission control device 20 or becomes a negative voltage signal. The waveform monitor circuit 14 receives the coil end signal CSG and generates the induced voltage signal PHIN for waveform monitoring as a signal whose waveform can be detected by the load state detection circuit 30 of the power transmission control device 20 to output to a waveform monitoring terminal or the like of the power transmission control device 20. A display 16 displays various states (such as a power transmission state and ID authentication) of the contactless power transmission system by using colors, images, and the like.

An oscillation circuit 24 generates a clock signal of the primary side. A driving clock generating circuit 25 generates a driving clock determining a driving frequency. A driver control circuit 26 generates a control signal having a desired frequency based on the driving clock from the driving clock generating circuit 25, a frequency setting signal from the controller 22, and the like, and outputs the control signal to a first power transmission driver and a second power transmission driver of the power transmission section 12 to control the first and the second power transmission drivers.

The load state detection circuit 30 shapes the waveform of the induced voltage signal PHIN to generate a waveform-shaped signal. For example, the waveform-shaped signal generated is a pulse signal having a square wave (a rectangular wave) that becomes active (e.g. H level) when the signal PHIN exceeds a predetermined threshold voltage. Then, the load state detection circuit 30 detects pulse width information (a pulse width duration) of the waveform-shaped signal based on the waveform-shaped signal and the driving clock. Specifically, based on the waveform-shaped signal and the driving clock received from the driving clock generating circuit 25, the load state detection circuit 30 detects the pulse width information of the waveform-shaped signal to detect pulse width information of the induced voltage signal PHIN.

The load state detection circuit 30 is not restricted to a pulse width detection circuit (a phase detection circuit) and may be any circuit, such as a current detection circuit or a peak voltage detection circuit.

The controller 22 (the power transmission control device) determines the load state (a load fluctuation and a load level: high or low) of the power transmission side (the secondary side) based on a detection result of the load state detection circuit 30. For example, the controller 22 determines the load state of the power transmission side based on the pulse width information detected by the load state detection circuit 30 (a pulse width detection circuit) to execute, for example, detection of data (load), detection of a foreign (metal) object, detection of removal (detachment), and the like. In other words, a pulse width duration as the pulse width information of an induced voltage signal changes according to a change in the load state of the power receiving side. The controller 22 can detect the load fluctuation of the power receiving side based on the pulse width duration (a count value obtained by measurement of the pulse width duration).

The power receiving section 42 converts an induced AC voltage of the secondary coil L2 to a DC voltage. The conversion is executed by a rectifying circuit 43 included in the power receiving section 42.

The load modulation section 46 executes load modulation processing. Specifically, to transmit desired data from the power receiving device 40 to the power transmission device 10, the load modulation section 46 variably changes a load of the load modulation section 46 (the secondary side) according to data to be transmitted, so as to change a signal waveform of an induced voltage of the primary coil L1. To do this, the load modulation section 46 includes a resistance RB3 and a transistor TB3 (an N-type CMOS transistor) provided in series between nodes NB3 and NB4. The transistor TB3 is turned on and off by a signal P3Q from the controller 53 of the power receiving control device 50. When executing load modulation by turning on and off the transistor TB3, the transistor TB2 of the power feeding control section 48 is turned off to electrically disconnect the load 90 from the power receiving device 40.

The power feeding control section 48 controls feeding of power to the load 90. A regulator 49 adjusts a voltage level of a DC voltage VDC obtained in the conversion by the rectifying circuit to generate a power supply voltage VD5 (e.g. 5V). The power receiving control device 50 is operated, for example, by supply of the power supply voltage VD5.

The transistor TB2 (a P-type CMOS transistor as a power feeding transistor) is controlled by a signal P1Q from the controller 52 of the power receiving control device 50. Specifically, the transistor TB2 is turned off during the negotiation processing and the setup processing, and is turned on after the start of normal power transmission.

A position detection circuit 56 determines whether the positional relation between the primary and the secondary coils L1 and L2 is appropriate or not. An oscillation circuit 58 generates a secondary-side clock. A frequency detection circuit 60 detects a frequency (f1 or f2) of a signal CCMPI. A full charge detection circuit 62 detects whether the battery 94 (a secondary cell) of the load 90 is fully charged (a full charge state) or not.

The load 90 may include a charge control device 92 executing charge control or the like of the battery 94. The charge control device 92 (a charge control IC) may be an integrated circuit device or the like. Alternatively, the battery 94 in itself may serve as the charge control device 92, like a smart battery.

8. Detailed Operational Example

Figure 15:
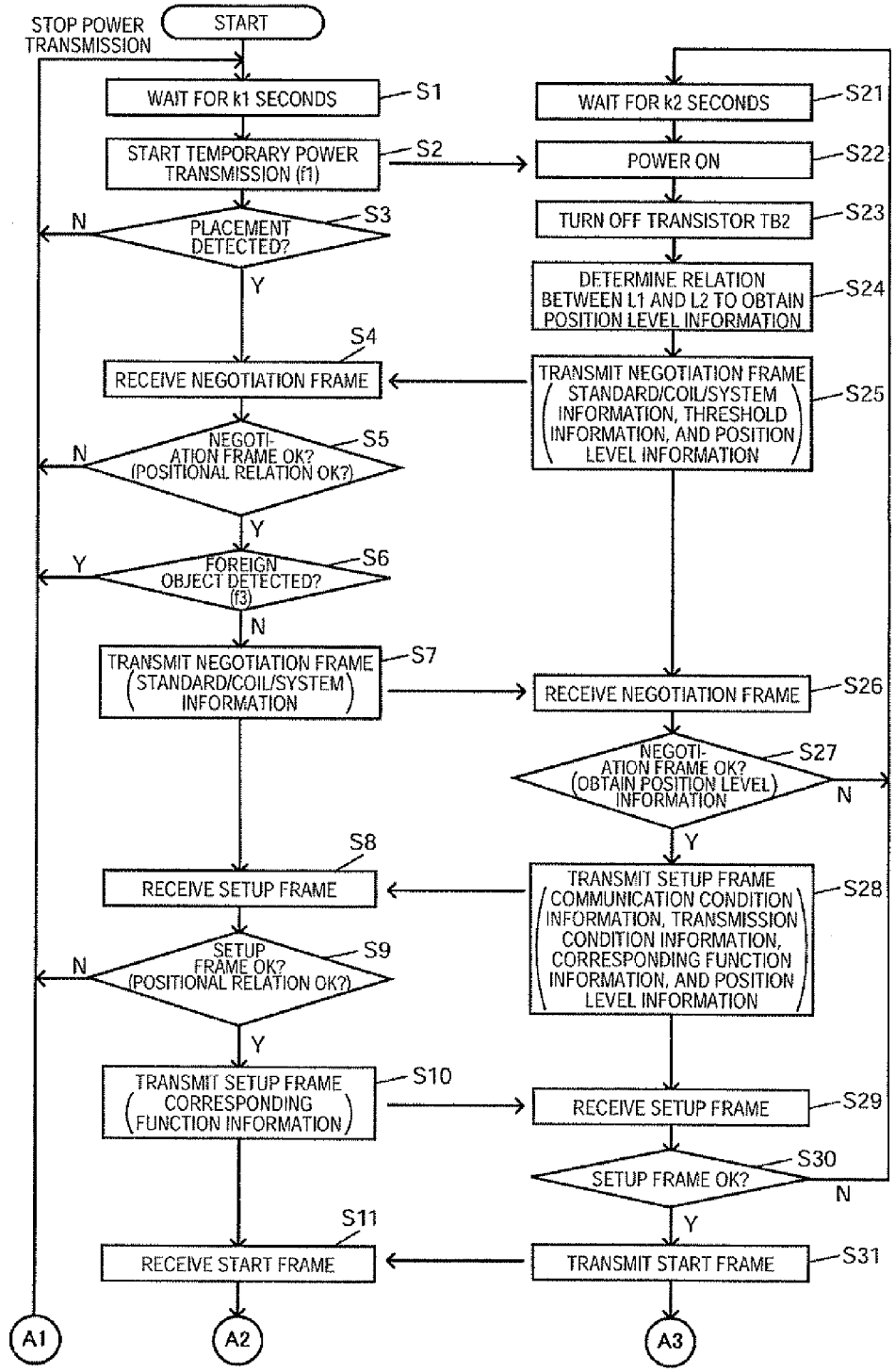
FIG. 15 is a flowchart illustrating operation of the power transmission device and the power receiving device according to the embodiment.

Next, details of operation by the power transmission side and the power receiving side will be described with reference to flowcharts of FIGS. 15 to 17. FIG. 15 is a flowchart illustrating processing of the power transmission side on a left column and processing of the power receiving side on a right column.

As shown in FIG. 15, when powering up to turn on the devices, the power transmission side waits for k1 second(s), for example (Step S1), and then, executes temporary power transmission before starting normal power transmission (Step S2). The temporary power transmission is executed by temporarily transmitting power to execute detection of placement, position, and the like of an electronic apparatus. In short, power is transmitted to detect whether the electronic apparatus is placed on a charger or not, and if placed thereon, whether the apparatus is placed in an appropriate position or not. A driving frequency (a frequency of a driving clock from the driving clock generating circuit) in the temporary power transmission is set to f1, for example.

By the temporary power transmission from the power transmission side, the power receiving side is powered on (Step S22), and thus, the power receiving control device 50 is powered on to be reset. The power receiving control device 50 sets the signal P1Q to H level, whereby the transistor TB2 (the power feeding transistor) of the power feeding control section 48 is turned off (Step S23) to electrically disconnect from the load 90.

Next, the power receiving side determines the positional relation (the positional level) between the primary and the secondary coils L1 and L2 to obtain positional level information as the positional relation information (Step S24).

Regardless of the appropriateness of the positional relation, the power receiving side generates a negotiation frame to transmit the frame to the power transmission side (Step S25). Specifically, the negotiation frame is transmitted by using load modulation. For example, the negotiation frame includes matching codes of standard information and coil information, and hardware information such as system information (a load state detection system) and the threshold information (a threshold for load state detection) stored in the register section 53 of the power receiving-side. In addition, the negotiation frame further includes the position level information (the positional relation information) obtained at Step S24.

The power transmission side receives the negotiation frame (Step S4) to verify the frame (Step S5). Specifically, it is determined whether or not the standard/coil/system information stored in the register section 23 of the power transmission side is compatible with standard/coil/system information received from the power receiving side. Additionally, based on the positional relation information added to the negotiation frame, it is also determined whether or not the positional relation between the primary and the secondary coils L1 and L2 is appropriate. Then, if the negotiation frame is determined to be appropriate, the power transmission side executes detection of a foreign object (Step S6).

Specifically, the power transmission side sets the driving frequency to a foreign object detection frequency f3 to execute the primary foreign object detection before the start of normal power transmission based on the threshold information (safety threshold information) received from the power receiving side, thereby determining whether the load state of the power receiving side is appropriate or not. For example, the power transmission side sets a foreign object detection enable signal to active to direct the load state detection circuit 30 to start detection of a foreign object. The foreign object detection is executed, for example, by comparing the load state detection information (the pulse width information) from the load state detection circuit 30 with a load state detection threshold (META) received from the power receiving side. When the foreign object detection time finishes, the power transmission side returns the driving frequency to the frequency f1.

If, at Step S5, the negotiation frame is determined to be inappropriate or if, at Step S6, any foreign object is determined to be detected, the power transmission side stops power transmission to return to Step S1.

Next, the power transmission side creates a negotiation frame to transmit the frame to the power receiving side (Step S7). For example, the negotiation frame includes the standard information, the coil information, and the system information stored in the register section 23 of the power transmission side.

The power receiving side receives the negotiation frame (Step S26) to verify the frame (Step S27). Specifically, it is determined whether the standard/coil/system information stored in the register section 53 of the power receiving side is compatible with standard/coil/system information received from the power transmission side. Additionally, the appropriateness of the positional relation between the primary and the secondary coils L1 and L2 is again determined to obtain position level information. Then, if the negotiation frame is determined to be appropriate, the power receiving side creates a setup frame to transmit the frame to the power transmission side (Step S28). The setup frame includes communication condition information, transmission condition information, and corresponding function information, along with the position level information. In this case, the communication condition information may be a communication method, a communication parameter, and the like, and the transmission condition information may be information regarding a driving voltage and a driving frequency of the primary coil, and the like. In addition, the corresponding function information may be information indicating an additional function in each application. If the negotiation frame is inappropriate, the power receiving side returns to Step S21.

The power transmission side receives the setup frame (Step S29) to verify the setup frame (Step S9). If the setup frame from the power receiving side is appropriate, the power transmission side creates a setup frame to transmit the frame to the power receiving side (Step S10). If the setup frame from the power receiving side is inappropriate, the power transmission side stops power transmission to return to Step S1.

The power receiving side receives the setup frame (Step S29) to verify the setup frame (Step S30). If the setup frame received is appropriate, the power receiving side creates a start frame to transmit the start frame to the power transmission side (Step S31). Conversely, if the setup frame is inappropriate, the power receiving side returns to Step S21.

When the start frame is transmitted, the power transmission side and the power receiving side shift to a step for command branch. In other words, command determination is executed to branch a command into command processings according to various flags.

Figure 16:
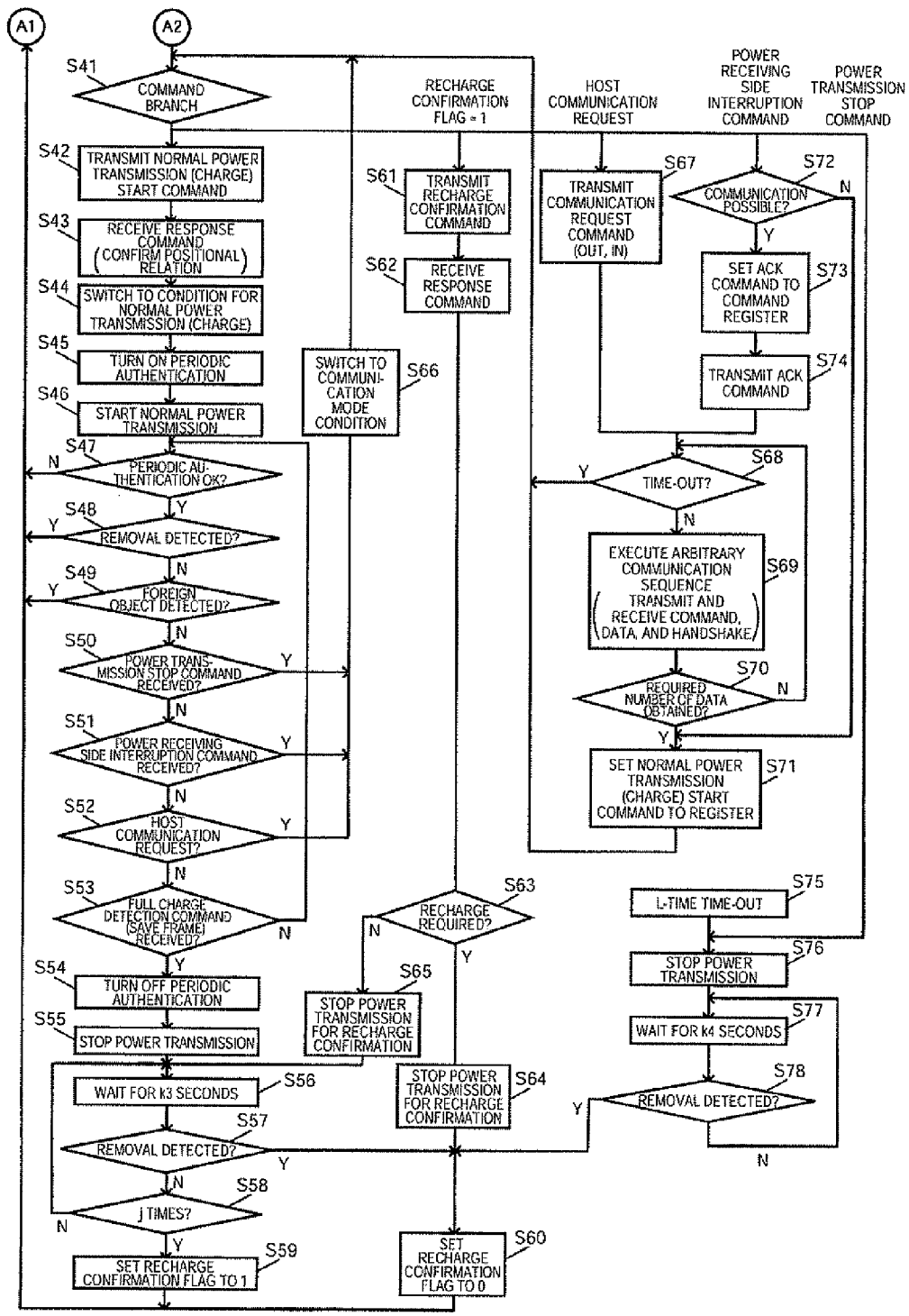
FIG. 16 is a flowchart illustrating operation of the power transmission device according to the embodiment.

FIG. 16 is a flowchart illustrating processing of the power transmission side after the command branch. As shown in FIG. 16, in the command branch of Step S41, if there is no any other command requiring preferential processing (such as a communication request, an interruption, a power transmission stop, or a recharge confirmation flag (=1)), the power transmission side transmits a normal power transmission (charge) start command to the power receiving side (Step S42). Next, the power transmission side receives a response command (sent in response to the normal power transmission start command) from the power receiving side. Then, based on the position level information added to the received response command, the power transmission side verifies the position relation between the primary and the secondary coils L1 and L2 (Step S43) and switches the transmission condition and the communication condition to those for normal power transmission (Step S44), namely, to the transmission condition and the communication condition set in the setup processing. Next, the power transmission side turns on periodic authentication (Step S45) to start normal power transmission (Step S46).

After starting the normal power transmission, in the periodic authentication period by periodic load modulation, the power transmission side executes detection of a takeover state by a foreign metal object having a large area (Step S47), as well as executes removal detection and foreign object detection (Steps S48 and S49). If any takeover, removal, or foreign object is detected in the periodic authentication, the power transmission side stops power transmission to return to Step S1.

Next, the power transmission side determines whether a power transmission stop command (a STOP command) from the power receiving-side host 4 has been received or not (Step S50), whether an interruption command (an INT command) from the power receiving-side host 4 has been received or not (Step S51), and whether or not there has been a host communication request (an OUT/IN transmission command) from the power transmission-side host 2 (Step S52).

If there is no reception of the commands and the request, the power transmission side determines whether a full charge detection command (a save frame) has been received or not from the power receiving side (Step S53), and returns to Step S47 if not. Conversely, if received, the power transmission side turns off the periodic authentication to stop power transmission (Steps S54 and S55), and then shifts into the standby phase after the full charge detection (Step S56).

In the standby phase after the full charge detection, the power transmission side executes removal detection, for example, once every k3 seconds (Step S57). When removal is detected, the power transmission side resets the recharge confirmation flag to 0 (Step S60) to stop power transmission and return to Step S1.

Furthermore, in the standby phase after the full charge detection, the power transmission side executes recharge confirmation, for example, once every k3×j seconds to set the recharge confirmation flag to 1 (Steps S58 and S59), and then stops power transmission and return to Step S1.

At Step S59, when the recharge confirmation flag is set to 1, the power transmission side returns to Step S1, and thereafter, executes the negotiation processing and the setup processing. Next, in the command branch of Step S41, the power transmission side shifts into recharge confirmation mode processing, since the recharge confirmation flag is 1.

Specifically, the power transmission side transmits a recharge confirmation command to the power receiving side (Step S61). Then, after receiving a response command sent from the power receiving side in response to the recharge confirmation command (Step S62), the power transmission side determines whether recharge of the battery 94 is necessary or not based on a check result of a battery voltage received together with the response command (Step S63). If recharge is determined to be necessary, the power transmission side stops power transmission (temporary power transmission) for recharge confirmation (Step S64) and sets the recharge confirmation flag to 0 to return to Step S1. If recharge is determined to be unnecessary, the power transmission side stops power transmission for recharge confirmation (Step S65) and returns from the recharge confirmation mode to the standby mode after the full charge detection (Steps S56 to S58).

If the power transmission side determines at Steps S50 and S51 that a power transmission stop command or an interruption command has been received, or determines at Step S52 that a communication request from the host 2 has been received, the power transmission side switches the transmission condition and the communication condition for the contactless power transmission to conditions for communication mode (conditions for temporary power transmission) from normal power transmission mode (Step S66). For example, the driving frequency and the driving voltage may be switched or the threshold parameter for load state detection of the power receiving side may be switched. Then, the power transmission side shifts to the command branch of Step S41.

For example, if it is determined at Step S52 that a communication request from the power transmission-side host 2 has been made, command branch is executed at Step S41 to branch into the communication mode processing by the host request. In the communication mode by the host request, the power transmission side transmits an OUT transmission command or an IN transmission command as a communication request command issued by the host 2 to the power receiving side (Step S67). Then, the power transmission side waits for a response from the power receiving side and determines whether a time-out has occurred or not (Step S68). If it is time-out, the operation is returned to Step S41, whereas if not, the power transmission side executes an arbitrary communication sequence based on an arrangement between the hosts 2 and 4 (Step S69). Specifically, as described in FIGS. 7 and 8, transmission and reception of command, data, and handshakes, respectively, are executed. Next, it is determined whether a required number of data has been obtained (Step S70). If obtained, the power transmission side sets the normal power transmission start command (the charge start command) to the command register 114 (Step S71) and returns to Step S41. This allows a return from the communication mode to the normal power transmission mode (the charge mode).

If it is determined at Step S51 that an interruption command (an INT command) has been received from the power receiving side, in the command branch of Step S41, the command is branched into processing of communication mode by the interruption command. In the communication mode by the interruption command from the power receiving side, first, it is determined whether communication is possible or not at a present state (Step S72), and if not, the operation is shifted to Step S71. If communication is determined to be possible, the power transmission side sets an ACK command to the command register 114 to transmit to the power receiving side (Steps S73 and S74), and shifts into the processing of the communication mode of Steps S68 to S70.

If it is determined at Step S50 that a power transmission stop command (a STOP command) has been received from the power receiving side, in the command branch of Step S41, the command is branched into processing of the power transmission stop command. Then, the power transmission side stops power transmission to the power receiving side (Step S76) to execute removal detection, for example, once every k4 seconds (Steps S77 and S78). If removal is detected, the operation is shifted to Step S60 to return to Step S1. Also if a time-out of an L-time timer for measuring a continuous charge time occurs (Step S75), the power transmission side shifts to Step S76 to stop power transmission.

As described above, in the embodiment, in case of the communication request from the power transmission-side host 2 (Step S52) and in case of the reception of the interruption command from the power receiving-side host 4 (Step S51), the power transmission side executes switching to conditions for communication mode (Step S66). Then, the power transmission side shifts into the communication mode for executing the communication sequence processing of Steps S68 to S70. After completion of the communication mode, the power transmission side issues a normal power transmission start command (Step S71) to restart normal power transmission.

Figure 17:
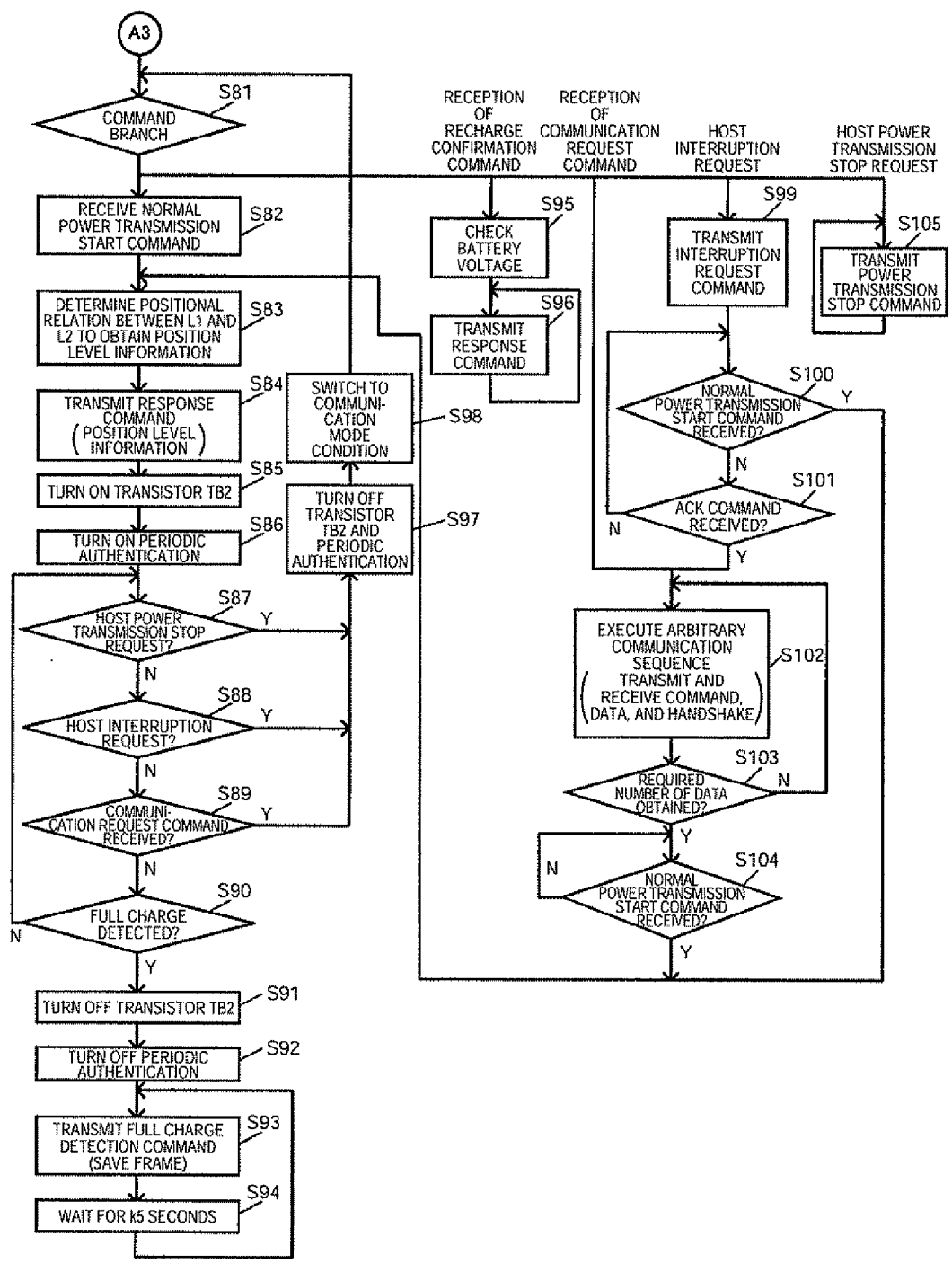
FIG. 17 is a flowchart illustrating operation of the power receiving device according to the embodiment.

FIG. 17 is a flowchart illustrating processing of the power receiving side after the command branch. As shown in FIG. 17, in the processing of the power receiving side, in the command branch of Step S81, there are not any other commands (communication request, interruption, power transmission stop, and the like) requiring preferential processing. The power receiving side receives a normal power transmission start command from the power transmission side (Step S82) and determines again the appropriateness of the positional relation between the primary and the secondary coils L1 and L2 to obtain position level information as positional relation information (Step S83). Then, the power receiving side transmits a response command including the position level information to the power transmission side (Step S84).

After transmitting the response command, the power receiving side turns on the transistor TB2 of the power feeding control section 48 (Step S85) to start power supply to the load 90, and turns on periodic authentication to execute periodic load modulation (Step S86). Specifically, the transistor TB3 of the load modulation 46 is turned on and off in a predetermined pattern during a periodic authentication time.

Next, the power receiving side determines whether a power transmission stop request (a STOP command) has been received or not from the power receiving-side host 4 (Step S87) and determines whether an interruption command (an INT command) has been received or not from the power receiving-side host 4 (Step S88). In addition, the power receiving side determines whether a communication request command (an OUT/IN transmission command) has been received or not from the power transmission-side host 2 (Step S89).

If there is no reception of the requests and the command, the power receiving side detects whether the battery 94 has been fully charged or not (Step S90). If full charge is not detected, the operation is returned to Step S87. If full charge is detected, the power receiving side turns off the transistor TB2 (Step S91) to stop power supply to the load 90, and also turns off periodic authentication (Step S92). Then, the power receiving side transmits a full charge detection command (a save frame) for notifying detection of full charge to the power transmission side (Step S93). After waiting for k5 seconds (Step S94), the power receiving side returns to Step S93 to repeat the processing.

When the power transmission side starts power transmission (temporary power transmission) for recharge confirmation, the power receiving side is powered on to be reset to execute the negotiation processing and the setup processing. Then, when receiving the recharge confirmation command (See Step S61) transmitted from the power transmission side, the power receiving side shifts into recharge confirmation mode processing in the command branch of Step S81.

Specifically, the power receiving side checks a battery voltage (Step S95) to transmit a response command corresponding to the recharge confirmation command and a check result of the battery voltage to the power transmission side (Step S96). When power transmission for recharge confirmation is stopped, the power receiving side is powered off.

When determining at Steps S87 and S88 that a power transmission stop request or an interruption request has been made from the host 4 or determines at Step S89 that a communication request command has been received, the power receiving side turns off the power feeding transistor TB2 and periodic authentication (Step S97). Then, the power receiving side switches a transmission condition and a communication condition to those for communication mode (Step S98) to shift to the command branch of Step S81.

For example, at Step S89, if it is determined that the communication request command (the OUT/IN transmission command) has been received from the power transmission side, in the command branch of Step S81, the command is branched into processing of communication mode by the communication request from the power transmission side, and then, an arbitrary communication sequence based on the arrangement between the hosts 2 and 4 is executed (Step S102). In other words, as described in FIGS. 7 and 8, transmission and reception of commands, data, and handshakes, respectively, are executed. Next, it is determined whether a required number of data has been obtained (Step S103). If obtained, the power receiving side determines whether the normal power transmission start command transmitted from the power transmission side (See Step S71) has been received or not (Step S104). If received, the operation is shifted to Step S83 and the communication mode is returned into the normal power transmission mode (the charge mode).

In addition, at Step S88, if it is determined that an interruption request has been made from the power receiving-side host 4, the command branch at Step S81 is executed to branch into processing of communication mode by the interruption request of the power receiving side. In the communication mode by the interruption request of the power receiving side, the power receiving side transmits a communication request command (an INT command) to the power transmission side (Step S99). Next, the power receiving side determines whether a normal power transmission start command has been received or not from the power transmission side (Step S100), and if not received, determines whether an ACK command (See Step S74) has been received or not (Step S101). If received, the operation is shifted to the communication mode processing of Steps S102 and S103.

In addition, at Step S87, if it is determined that a power transmission stop request has been made from the power receiving-side host 4, at Step 81, the command branch is executed to branch into processing by the power transmission stop request. Then, the power receiving side transmits a power transmission stop command to the power transmission side (Step S105) and is powered off when power transmission is stopped.

As described above, in the embodiment, when the communication request command has been received from the power transmission-side host 2 (Step S89) or when the interruption request has been made from the power receiving-side host 4, the power receiving side shifts into the communication mode for executing the communication sequence processing of Steps S102, S103, and the like. Then, after completion of the communication mode, the power receiving side returns to the normal power transmission mode.

While the embodiment has been described in detail as above, it will be apparent to those skilled in the art that many modifications are possible without substantially departing from the novel teachings and advantages provided by the invention. Thus, it is intended that such modifications are all included in the scope of the invention. For example, in the specification and the drawings, any term cited, at least once, with a different term having a broader or same meaning can be replaced by the different term in any place in the specification and the drawings. Furthermore, all combinations of the embodiment and the modifications can also be included in the scope of the invention. The structures and the operation of the power transmission control device, the power transmission device, the power receiving control device, and the power receiving device, the data transmission method, the command setting method, the communication processing, the host interface processing, the load state detection method described in the embodiment are merely examples, and various modifications are possible.

What is claimed is:

1. A power transmission control device included in a power transmission device in a contactless power transmission system that transmits power from the power transmission device to a power receiving device by electromagnetically coupling a primary coil to a secondary coil to supply the power to a load of the power receiving device, the power transmission control device comprising: a controller controlling the power transmission control device; a host interface communicating with a power transmission-side host; and a register section accessible from the power transmission-side host via the host interface, the controller shifting into a communication mode that executes communication between the power transmission-side host and a power receiving-side host, when the power transmission-side host writes, via the host interface, a communication request command that requests the communication between the hosts to the register section, as well as the controller transmitting the communication request command to the power receiving device, and wherein the register section including a command register in which a command issued by the power transmission-side host is written and a data register that buffers data; and the controller transmitting, to the power receiving device, an OUT transmission command that requests data transmission from the power transmission-side host to the power receiving-side host when the OUT transmission command is written in the command register; and then, the controller transmitting a data transmission command that directs the data transmission and data to the power receiving device when the data transmission command is written in the command register and the data is written in the data register.

2. The power transmission control device according to claim 1, the controller receiving a communication request by the communication request command after completion of an authentication processing between the power transmission device and the power receiving device and a start of normal power transmission.

3. The power transmission control device according to claim 1, the register section including a command register in which a command issued by the power transmission-side host is written and a data register that buffers data; and the controller transmitting, to the power receiving device, an OUT transmission command that requests data transmission from the power transmission-side host to the power receiving-side host when the OUT transmission command is written in the command register; and then, the controller transmitting a data transmission command that directs the data transmission and data to the power receiving device when the data transmission command is written in the command register and the data is written in the data register.

4. The power transmission control device according to claim 1, the controller setting at least one of a transmission condition for contactless power transmission and a communication condition between the power transmission device and the power receiving device to a condition for the communication mode that is different from a condition for normal power transmission, when the controller shifts into the communication mode.

5. The power transmission control device according to claim 4, the controller switching a driving frequency or a driving voltage of the primary coil to a driving frequency or a driving voltage of the coil for the communication mode, when shifting into the communication mode.

6. The power transmission control device according to claim 1, the register section including a status register having a bit that allows the power transmission-side host to confirm a power transmission state of contactless power transmission.

7. The power transmission control device according to claim 6, the load including a battery, and the status register having a bit that allows the power transmission-side host to confirm a charge state of the battery.

8. The power transmission control device according to claim 1, the register section including an interruption register having a bit that notifies reception of a command issued by the power receiving-side host to the power transmission-side host upon reception of the command.

9. The power transmission control device according to claim 8, the load including a battery, and the interruption register having a bit that notifies a start of charging of the battery to the power transmission-side host.

10. The power transmission control device according to claim 1, the controller shifting into the communication mode upon reception of an interruption command for a communication request issued by the power receiving-side host.

11. A power transmission device including the power transmission control device of claim 1 and a power transmission section that generates an alternating-current voltage to supply to the primary coil.

12. An electronic apparatus including the power transmission device of claim 11.

13. The power transmission control device according to claim 1, the controller issuing a normal power transmission start command after completion of the communication mode.

14. A power transmission control device included in a power transmission device in a contactless power transmission system that transmits power from the power transmission device to a power receiving device by electromagnetically coupling a primary coil to a secondary coil to supply the power to a load of the power receiving device, the power transmission control device comprising: a controller controlling the power transmission control device; a host interface communicating with a power transmission-side host; and a register section accessible from the power transmission-side host via the host interface, the controller setting at least one of a transmission condition for contactless power transmission and a communication condition between the power transmission device and the power receiving device to a condition for a communication mode that is different from a condition for normal power transmission, when shifting into the communication mode that executes communication between the power transmission-side host and the power receiving-side host, and wherein the register section including a command register in which a command issued by the power transmission-side host is written and a data register that buffers data; and the controller transmitting, to the power receiving device, an OUT transmission command that requests data transmission from the power transmission-side host to the power receiving-side host when the OUT transmission command is written in the command register; and then, the controller transmitting a data transmission command that directs the data transmission and data to the power receiving device when the data transmission command is written in the command register and the data is written in the data register.

15. The power transmission control device according to claim 14, the controller issuing a normal power transmission start command after completion of the communication mode.

16. A power receiving control device included in a power receiving device in a contactless power transmission system that transmits power from a power transmission device to the power receiving device by electromagnetically coupling a primary coil to a secondary coil to supply the power to a load of the power receiving device, the power receiving control device comprising: a controller controlling the power receiving control device; a host interface communicating with a power receiving-side host; and a register section accessible from the power receiving-side host via the host interface, the controller shifting into a communication mode that executes communication between a power transmission-side host and the power receiving-side host, when receiving a communication request command that requests the communication between the hosts from the power transmission device, and wherein the register section including a command register in which a command issued by the power receiving-side host is written, and the controller shifting into the communication mode when the power receiving-side host writes an interruption command for a communication request to the power transmission-side host in the command register.

17. The power receiving control device according to claim 16, the controller receiving a communication request by the communication request command after completion of an authentication processing between the power transmission device and the power receiving device and a start of normal power transmission.

18. The power receiving control device according to claim 16, the load including a battery, and the register section including a status register having a bit that allows the power receiving-side host to confirm a charge state of the battery.

19. The power receiving control device according to claim 16, the register section including an interruption register having a bit that notifies reception of a command issued by the power transmission-side host to the power receiving-side host upon reception of the command.

20. A power receiving device including the power receiving control device of claim 16 and a power receiving section that converts an induced voltage of the secondary coil to a direct-current voltage.

21. An electronic apparatus including the power receiving device of claim 20 and a load that receives power from the power receiving device.

22. The power receiving control device according to claim 16, the controller supplying the power to the load when receiving a normal power transmission start command after completion of the communication mode.

* * * * *